(12) United States Patent
Ryu

(10) Patent No.: US 11,855,393 B2
(45) Date of Patent: Dec. 26, 2023

(54) CONNECTOR CAPABLE OF CONNECTING ANTENNA AND ELECTRONIC DEVICE COMPRISING SAME

(71) Applicant: Samsung Electronics Co., Ltd., Gyeonggi-do (KR)

(72) Inventor: Heejun Ryu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 736 days.

(21) Appl. No.: 16/968,219

(22) PCT Filed: Feb. 1, 2019

(86) PCT No.: PCT/KR2019/001464
§ 371 (c)(1),
(2) Date: Aug. 7, 2020

(87) PCT Pub. No.: WO2019/156455
PCT Pub. Date: Aug. 15, 2019

(65) Prior Publication Data
US 2021/0036472 A1 Feb. 4, 2021

(30) Foreign Application Priority Data
Feb. 9, 2018 (KR) .................. 10-2018-0016326

(51) Int. Cl.
*H01R 24/60* (2011.01)
*H04M 1/72409* (2021.01)
(Continued)

(52) U.S. Cl.
CPC ............. *H01R 24/60* (2013.01); *H01Q 1/241* (2013.01); *H01Q 9/045* (2013.01); *H04M 1/72409* (2021.01); *H04M 1/72412* (2021.01)

(58) Field of Classification Search
CPC ........ H01R 24/60; H01R 24/62; H01R 29/00; H04M 1/72409; H04M 1/72412; H01Q 11/241; H01Q 9/045
See application file for complete search history.

(56) References Cited

U.S. PATENT DOCUMENTS 8,417,292 B2 * 4/2013 Kim .................. H04M 1/72409
710/63
8,838,171 B2 * 9/2014 Jang .................. H04M 1/72409
455/557

(Continued)

FOREIGN PATENT DOCUMENTS

KR   10-2017-0019733 A   2/2017
KR   10-2017-0049958 A   5/2017

(Continued)

OTHER PUBLICATIONS

Notice of Preliminary Rejection dated Jun. 15, 2022.
Notice of Final Rejection dated Dec. 14, 2022.
Notice of Patent Grant dated Mar. 10, 2023.

*Primary Examiner* — Tho D Ta
(74) *Attorney, Agent, or Firm* — Cha & Reiter, LLC

(57) ABSTRACT

Various embodiments of the disclosure relate to an electronic device comprising a connector capable of connecting an antenna. The electronic device may comprise a connector and a wireless communication circuit which can receive wireless communication data. The connector may comprise a housing which forms the outer surface of the connector and has an opening on at least a part of the outer surface so that an external connector can be coupled thereto in a first direction or a second direction, a plurality of first pins corresponding to the first direction, and a plurality of second pins corresponding to the second direction. The plurality of first pins may comprise at least one first ground pin which corresponds to a first frequency band and can be connected (Continued)

to the wireless communication circuit, and at least one second ground pin which corresponds to a second frequency band and can be connected to the wireless communication circuit. The plurality of second pins may comprise at least one third ground pin which corresponds to the first frequency band and can be connected to the wireless communication circuit, and at least one fourth ground pin which corresponds to the second frequency band and can be connected to the wireless communication circuit. Other embodiments are also possible.

15 Claims, 30 Drawing Sheets

(51) Int. Cl.
*H01Q 1/24* (2006.01)
*H01Q 9/04* (2006.01)
*H04M 1/72412* (2021.01)

(56) References Cited

U.S. PATENT DOCUMENTS

| | | | |
|---|---|---|---|
| 2009/0111533 | A1 | 4/2009 | Johansson et al. |
| 2014/0055928 | A1* | 2/2014 | Lee ................. G06F 1/1632 361/679.01 |
| 2015/0093922 | A1* | 4/2015 | Bosscher .............. H02J 50/10 439/39 |
| 2015/0261714 | A1 | 9/2015 | Talmola |
| 2015/0346790 | A1 | 12/2015 | Talmola |
| 2016/0372870 | A1 | 12/2016 | Guo |
| 2017/0047640 | A1 | 2/2017 | Choi et al. |
| 2017/0127203 | A1 | 5/2017 | Ryu |
| 2018/0337697 | A1 | 11/2018 | Kim et al. |
| 2019/0097365 | A1 | 3/2019 | Lee et al. |

FOREIGN PATENT DOCUMENTS

| | | |
|---|---|---|
| KR | 10-2017-0068947 A | 6/2017 |
| KR | 10-2019-0036300 A | 4/2019 |

* cited by examiner

CONNECTOR CAPABLE OF CONNECTING ANTENNA AND ELECTRONIC DEVICE COMPRISING SAME

CROSS-REFERENCE TO RELATED APPLICATION(S)

This application is a National Phase Entry of PCT International Application No. PCT/KR2019/001464, which was filed on Feb. 1, 2019, and claims priority to Korean Patent Application No. 10-2018-0016326, which was filed on, Feb. 9, 2018 the contents of which are incorporated herein by reference.

TECHNICAL FIELD

Various embodiments of the disclosure relate to a connector capable of connecting an antenna and an electronic device having the same.

BACKGROUND ART

With the development of information communication technology and semiconductor technology, electronic devices have become able to provide various multimedia services. Such multimedia services may include at least one of voice communication service, message service, broadcast service, wireless internet service, camera service, or music playback service.

The electronic devices are able to provide extended functions using an external device connected through an interface (e.g., a connector) in order to satisfy various desires of a user. For example, the electronic devices may connect to an antenna (e.g., a digital multimedia broadcasting (DMB) antenna or a frequency modulation (FM) antenna), capable of receiving wireless communication data, through an analog audio connector (a 3.5 pi connector).

DISCLOSURE OF INVENTION

Technical Problem

The electronic devices may connect to a single-band antenna by sharing a ground port of the analog audio connector (the 3.5 pi connector) with a ground of the antenna or an earphone. Because the electronic devices support connection with the single-band antenna, the quality of wireless communication service (e.g., digital video broadcasting (DVB) service) supporting multiple bands may be degraded. For example, the DVB service may support band 3 (174 to 240 MHz), an ultra-high frequency (UHF) band (470 to 862 MHz) and an L band (1452 to 1492 MHz). Since the electronic devices are connected with an antenna that supports only any one of the multiple bands supported in the DVB service through the connector or supports an intermediate band among the multiple bands, the quality of DVB service may be degraded.

Various embodiments of the disclosure provide an electronic device having a connector capable of connecting to a multi-band antenna.

Solution to Problem

According to various embodiments of the disclosure, an electronic device includes: a wireless communication circuit capable of receiving wireless communication data; and a connector. The connector includes a housing that forms an outer surface of the connector and has an opening formed in at least a part of the outer surface to enable coupling with an external connector in a first direction or a second direction, a plurality of first pins corresponding to the first direction, and a plurality of second pins corresponding to the second direction. The plurality of first pins include at least one first ground pin, which corresponds to a first frequency band and is capable of being connected to the wireless communication circuit, and at least one second ground pin, which corresponds to a second frequency band and is capable of being connected to the wireless communication circuit, and the plurality of second pins include at least one third ground pin, which corresponds to the first frequency band and is capable of being connected to the wireless communication circuit, and at least one fourth ground pin, which corresponds to the second frequency band and is capable of being connected to the wireless communication circuit.

According to various embodiments of the disclosure, an electronic device includes: a wireless communication circuit capable of receiving wireless communication data; and a connector. The connector includes a housing that forms the outer surface of the connector and has an opening formed in at least a part of the outer surface to enable coupling with an external connector in a first direction or a second direction, a plurality of first pins corresponding to the first direction, and a plurality of second pins corresponding to the second direction. The plurality of first pins include at least one first ground pin, which corresponds to a first frequency band and is capable of being connected to the wireless communication circuit or a ground, and at least one second ground pin, which corresponds to a second frequency band and is capable of being connected to the wireless communication circuit or the ground, and the plurality of second pins include at least one third ground pin, which corresponds to the first frequency band and is capable of being connected to the wireless communication circuit or the ground, and at least one fourth ground pin, which corresponds to the second frequency band and is capable of being connected to the wireless communication circuit or the ground.

According to various embodiments of the disclosure, an operating method of an electronic device includes a wireless communication circuit and a connector, which is capable of being coupled with an external connector in a first or second direction and includes a plurality of first pins corresponding to the first direction and a plurality of second pins corresponding to the second direction, the operating method including: a process of detecting connection with the external connector; a process of selecting at least one of a plurality of ground pins included in the connector on the basis of a frequency band for wireless communication, wherein, among the plurality of ground pins, the first pins include at least one first ground pin, which corresponds to a first frequency band and is capable of being connected to the wireless communication circuit, and at least one second ground pin, which corresponds to a second frequency band and is capable of being connected to the wireless communication circuit, and the second pins include at least one third ground pin, which corresponds to the first frequency band and is capable of being connected to the wireless communication circuit, and at least one fourth ground pin, which corresponds to the second frequency band and is capable of being connected to the wireless communication circuit; and a process of connecting the at least one ground pin to the wireless communication circuit.

Advantageous Effects of Invention

The electronic device according to various embodiments includes a USB type-C connector capable of being connected to a multiband antenna through at least one ground pin, whereby wireless communication services can be provided through connection with the multiband antenna without an additional connector for attaching/detaching a separate antenna in addition to the USB type-C connector.

BEST MODE FOR CARRYING OUT THE INVENTION

Hereinafter, various embodiments of the disclosure will be described with reference to the accompanying drawings. Further, in the description of the embodiments of the disclosure, when it is determined that the detailed description of related well-known functions or constructions would obscure the gist of the disclosure, a detailed description thereof will be omitted. Further, technical terms used below are terms defined in consideration of functions thereof in the disclosure, which may vary according to the intention of a user or an operator, practice, or the like. Therefore, the terms should be defined on the basis of the contents of this specification.

Figure 1:
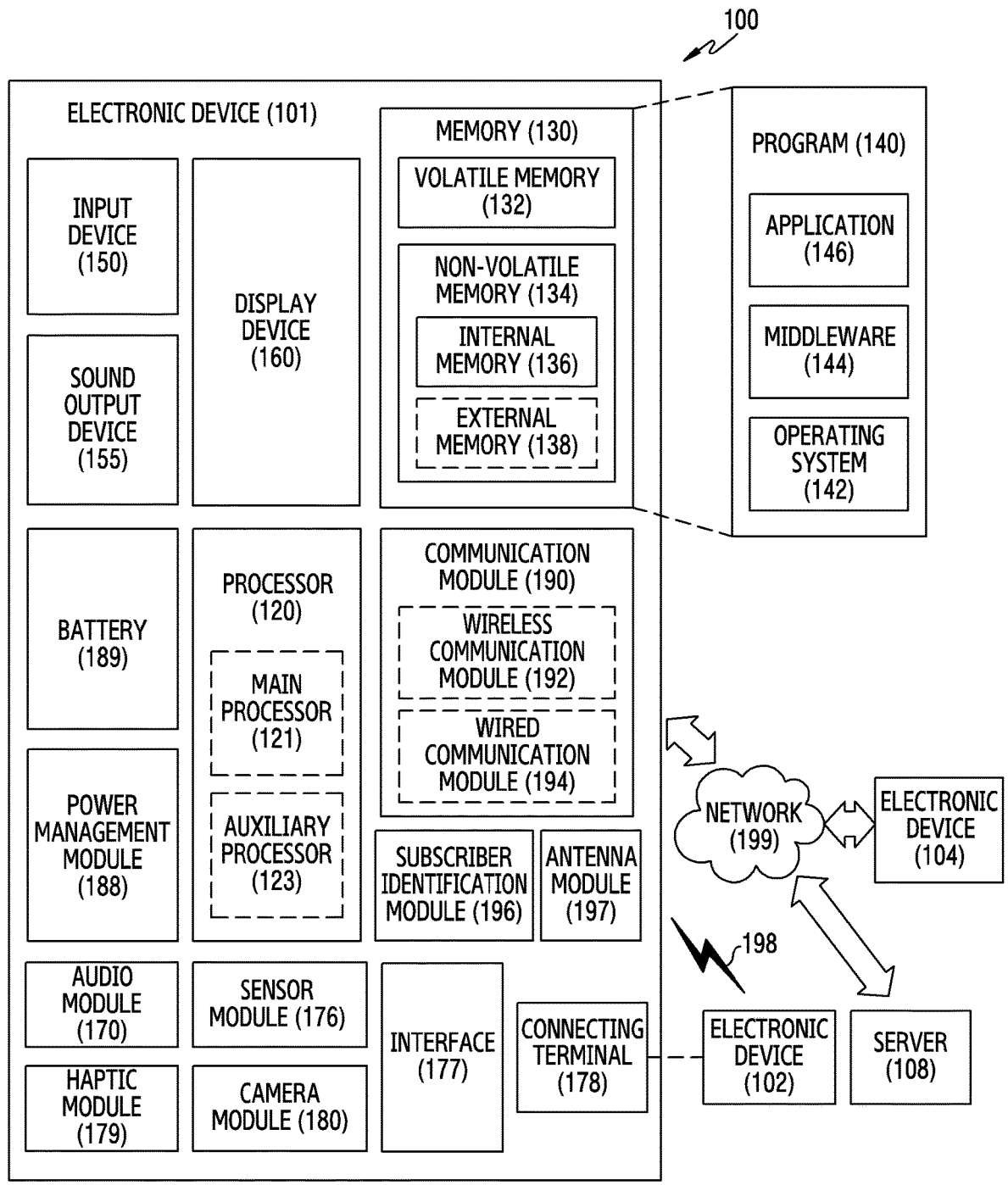
FIG. 1 is a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
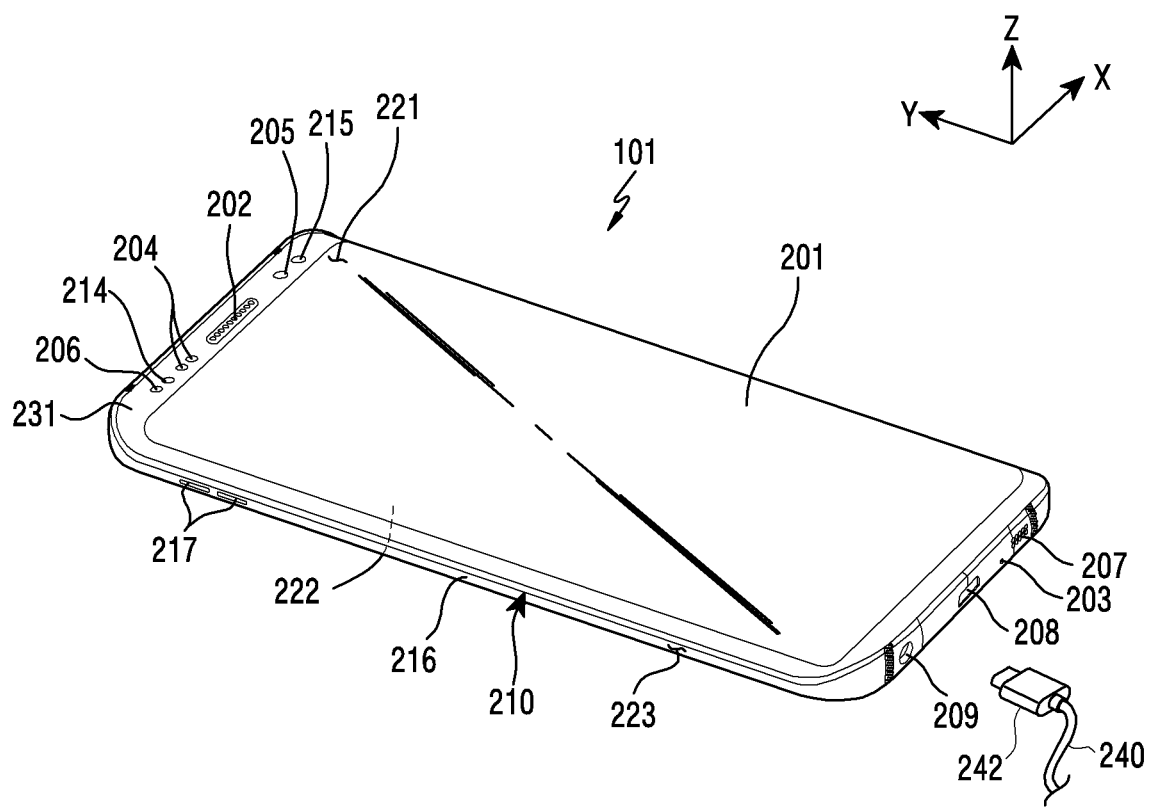
FIG. 2 is a perspective view of an electronic device according to various embodiments of the disclosure.

FIG. 2 is a perspective view of an electronic device according to various embodiments of the disclosure.

Referring to FIG. 2, an electronic device 101 (e.g., the electronic device 101 of FIG. 1) may include a housing 210. For example, the housing 210 may be formed of a conductive member and/or a non-conductive member.

According to an embodiment, the housing 210 may include a first surface 221 (e.g., a front surface or a top surface) that faces a first direction (e.g., a Z-axis direction), a second surface 222 (e.g., a rear surface or a bottom surface) that is disposed in the opposite direction relative to the first surface 221, and a lateral surface 223 that is disposed in such a way as to surround at least a part of the first surface 221 and the second surface 222. For example, the lateral surface 223 may be coupled with a front plate 231 and a rear plate, and may be formed of a lateral bezel structure 216 including a metal and/or a polymer.

According to an embodiment, the electronic device 101 may include the front plate 231 (e.g., a window or a glass plate) disposed on the first surface 221. A display 201 may be exposed to the outside through the front plate 231.

According to an embodiment, the electronic device 101 may include a receiver hole 202 for communication. For example, a speaker unit that outputs a sound received from a counterpart may be disposed inside the receiver hole 202 for communication. According to an embodiment, the electronic device 101 may include a microphone hole 203. For example, at least one microphone receiving an external sound may be disposed inside the microphone hole 203.

According to an embodiment, the electronic device 101 may include at least one key input unit 217. For example, the key input unit 217 may include at least one side key button 217 that is disposed on the lateral surface 223 of the housing 210. The at least one side key button 217 may include a volume control button, a power button, or a button for performing a specific function (e.g., an artificial intelligence operation function or a fast speech recognition operation mode entry function).

According to an embodiment, the electronic device 101 may include components that are exposed to the display 201 or perform functions through the front plate 231, but are disposed in such a way as not to be exposed to the outside, and are for performing various functions of the electronic device 101. For example, the components may include at least one sensor module 204. As an example, the sensor module 204 may include at least one of an illuminance sensor (e.g., a photosensor), a proximity sensor (e.g., a photosensor), an infrared sensor, an ultrasonic sensor, a fingerprint recognition sensor, a face recognition sensor, or an iris recognition sensor. For example, the components may include a first camera unit 205. For example, the components may include an indicator 206 (e.g., an LED device) for visually providing information about the state of the electronic device 101 to a user. For example, the components may include a light source 214 (e.g., an infrared LED) that is disposed on one side of a receiver 202. For example, the components may include a sensor 215 (e.g., an iris camera) for detecting an iris image in the state in which light emitted from the light source 214 is radiated near the eye of the user. For example, at least one of the components may be disposed to be exposed through at least a partial region of the second surface 222 (e.g., the rear surface or the bottom surface) that faces a direction (e.g., a −Z-axis direction) opposite to the first direction of the electronic device 101.

According to an embodiment, the electronic device 101 may include an external speaker hole 207. For example, a speaker that produces a sound and outputs the same to the outside may be disposed in the external speaker hole 207. According to an embodiment, the electronic device 101 may include a first connector hole 208 (e.g., an interface connector port) in which a connector (e.g., the connecting terminal 178 of FIG. 1) capable of connecting to an external device is disposed. As an example, the connector disposed in the first connector hole 208 may be configured in a socket shape. According to an embodiment, the electronic device 101 may include a second connector hole 209 (e.g., an earphone jack assembly) for connecting an earphone plug of the external device.

According to an embodiment, the first connector hole (the opening) 208 may be formed such that the connector is exposed to at least a partial region of the housing 210. The connector may be disposed in the first connector hole (the opening) 208. According to an embodiment, the connector may be coupled with an external connector 242 having a header shape of an external device 240 (e.g., the electronic device 102 of FIG. 1) through the first connector hole 208 in a first direction (a configuration channel 1 (CC1)) or a second direction (a CC2). Because the external connector 242 of the external device 240 is coupled with the connector of the electronic device 101 through the first connector hole 208, the electronic device 101 may be connected with the external device 240.

According to an embodiment, the connector of the electronic device 101 may include a board in the first connector hole (the opening) 208. The board may include a first surface on which many pins corresponding to a first direction are disposed, and a second surface on which many pins corresponding to a second direction (e.g., a direction opposite to the first direction) are disposed. As an example, the connector of the electronic device 101 may include a USB type-C connector. As an example, the external device 240 may include an audio unit (e.g., an earphone), a computer, a charger, a memory, an electric fan, or an antenna (e.g., a DMB antenna, a DVB antenna, a digital audio broadcasting (DAB) antenna, an integrated services digital broadcasting-terrestrial (ISDB-T) antenna, or an FM antenna).

Figure 3:
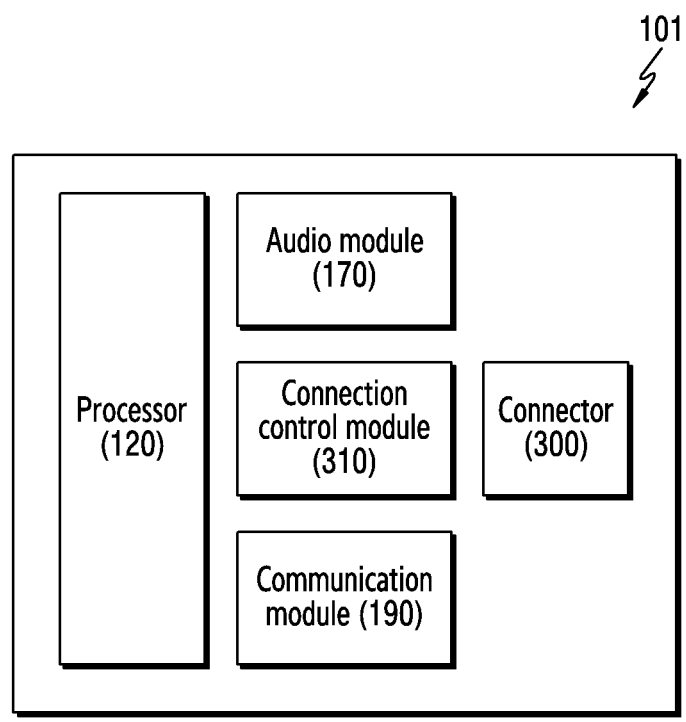
FIG. 3 is a block diagram of an electronic device having a connector enabling antenna connection according to various embodiments of the disclosure.

FIG. 3 is a block diagram of an electronic device having a connector capable of connecting to an antenna according to various embodiments of the disclosure. In the following description, the electronic device 101 may include the electronic device 101 of FIG. 1 or at least a part of the electronic device 101.

According to an embodiment, a processor 120 may detect connection with an external device (e.g., the electronic device 102 of FIG. 1 or the external device 240 of FIG. 2) through a connector 300 (e.g., the connecting terminal 178 of FIG. 1). For example, the processor 120 may detect connection with an external connector (e.g., the external connector 242 of FIG. 2) through at least one pin (e.g., a CC pin), among a plurality of pins included in the connector 300, and may identify the external device related to the external connector.

According to an embodiment, the processor 120 may connect at least one pin of the connector 300 and at least one internal module (e.g., an audio module 170 or a communication module 190). For example, in the case where an audio unit (e.g., an earphone) is connected through the connector 300, the processor 120 may connect at least one pin of the connector 300 and the audio module 170. The processor 120 may check a pin of the connector 300 for connection with the audio module 170 on the basis of the coupling direction of an audio unit (an external device) provided from a connection control module 310. As an example, the audio module 170 may receive an audio signal, which is input through a microphone of the audio unit (the external device) through at least one pin (e.g., an A8 pin or a B8 pin) of the connector 300. The audio module 170 may output an audio signal to the audio unit (the external device) through at least one pin (e.g., an A6 pin/A7 pin or a B6 pin/B7 pin) of the connector 300. As an example, the processor 120 may check an internal module connected with at least one pin of the connector 300 on the basis of the external device (e.g., identification information of the external device) connected through the connector 300.

According to an embodiment, the processor 120 may be connected with an external device (e.g., an antenna) for wireless communication using at least one ground pin of the connector 300. For example, among a plurality of ground pins (a pin A1, a pin A12, a pin B1, and a pin B12) of the connector 300, at least one pin may be connected with the communication module 190. The processor 120 may receive a wireless communication signal (e.g., a broadcasting data signal) from an external antenna through at least one ground pin of the connector 300. As an example, the processor 120 may check a pin of the connector 300 for connection with the communication module 190 on the basis of a coupling direction of an external connector provided from the connection control module 310. For example, the processor 120 may receive wireless communication signals (e.g., broadcasting data signals) of frequency bands different from one another through the ground pins included in the connector 300. As an example, the broadcasting data signals may include at least one of a DMB data signal, a DVB data signal, a DAB data signal, an ISDB-T data signal, or an FM data signal.

According to an embodiment, the processor 120 may selectively connect at least one ground pin of the connector 300 to the communication module 190. For example, the processor 120 may perform wireless communication with an external device through at least one ground pin among the plurality of ground pins included in the connector 300. The processor 120 may control at least one ground pin used for the wireless communication with the external device so as to connect the at least one ground pin with the communication module 190, and may control at least one other ground pin so as to connect the at least one other ground pin to a ground.

According to an embodiment, the connector 300 (e.g., the connecting terminal 178 of FIG. 1) may electrically or physically connect the electronic device 101 and an external device. For example, the connector 300 may be electrically or physically coupled with an external connector (e.g., the external connector 242 of FIG. 2) of the external device, and may connect the electronic device 101 and the external device. As an example, the connector 300 may include at least one pin that corresponds to the first direction for connection with an external connector connected in the first direction (CC1), and at least one pin that corresponds to the second direction for connection with an external connector connected in the second direction (CC2). The at least one pin that corresponds to the first direction and the at least one pin that corresponds to the second direction may be disposed in a reversible structure. As an example, the connector 300 may include a USB type-C connector.

According to an embodiment, the connection control module 310 may detect connection of an external device with the connector 300. For example, the connection control module 310 may recognize or identify the external device by detecting a change in the voltage of at least one pin coupled with the external connector among the pins of the connector 300. As an example, the connection control module 310 may recognize or identify the external connector (or the external device) connected to the connector 300 on the basis of a voltage detected through a CC pin (an A5 pin or a B5 pin), among the pins of the connector 300.

According to an embodiment, the connection control module 310 may detect a direction in which the external connector is connected to the connector 300. As an example, in the case where an external device other than an audio unit is connected through the connector 300, the connection control module 310 may determine the coupling direction (CC1 or CC2) of the external device to the connector 300 on the basis of the change in the voltage of the CC pin (the A5 pin or the B5 pin) of the connector 300. As an example, in the case where the audio unit is connected through the connector 300, the connection control module 310 may determine the coupling direction (CC1 or CC2) of the external device to the connector 300 on the basis of a change in the voltage of an A8 pin or a B8 pin of the connector 300.

Figure 4:
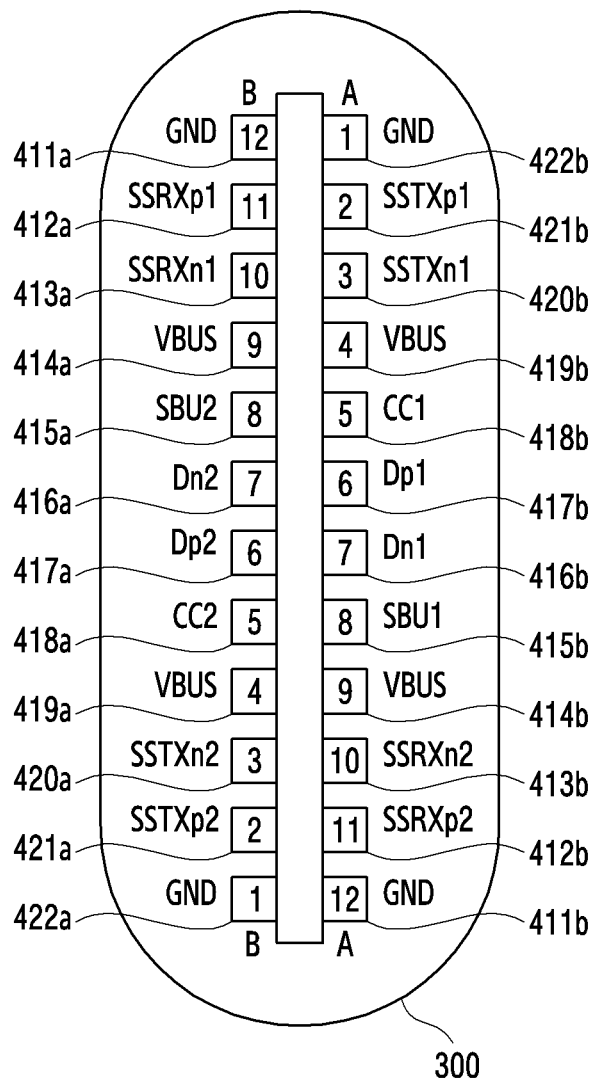
FIG. 4 illustrates the configuration of a connector according to various embodiments of the disclosure.

FIG. 4 illustrates the configuration of a connector according to various embodiments of the disclosure.

Referring to FIG. 4, the connector 300 may include a plurality of pins disposed in a reversible structure such that external connectors perform the same operation in the state in which the external connector is connected in the first direction (CC1) and in the state in which the external connector is connected in the second direction (CC2).

According to an embodiment, the connector 300 may include at least one pin corresponding to the first direction of the external connector at least one pin corresponding to the second direction (CC2) of the external connector. For example, the at least one pin corresponding to the first direction may include a ground (GND) pin 422*b*, an SSTXp1 pin 421*b*, a pin SSTXn1 420*b*, a pin VBUS 419*b*, a pin CC1 418*b*, a pin Dp1 417*b*, a pin Dn1 416*b*, a pin SBU1 415*b*, a pin VBUS 414*b*, a pin SSRXn2 413*b*, a pin SSRXp2 412*b*, and a ground pin 411*b*. For example, the at least one pin corresponding to the second direction may include a ground pin 422*a*, a pin SSTXp2 421*a*, a pin SSTXn2 420*a*, a pin VBUS 419*a*, a pin CC2 418*a*, a pin Dp2 417*a*, a pin Dn2 416*a*, a pin SBU2 415*a*, a pin VBUS 414*a*, a pin SSRXn1 413*a*, a pin SSRXp1 412*a*, and a ground pin 411*a*.

According to an embodiment, the pin SSTXp1 421*b* and the pin SSTXp2 421*a* may be used for super-speed TX of data along with the SSTXn1 pin 420*b* and the SSTXn2 pin 420*a*. According to an embodiment, the VBUS pins 414*a*, 414*b*, 419*a*, and 419*b* may be used to provide charging power through USB cables. According to an embodiment, the pin CC1 418*b* and the pin CC2 418*a* may be used to identify an external device and to check the coupling direction of an external device. According to an embodiment, the pin Dp1 417*b*, the pin Dp2 417*a*, the Dn1 pin 416*b*, and the pin Dn2 416*a* may be used to transmit/receive USB signals. The pin SBU1 415*b* and the pin SBU2 415*a* are extra pins, and may be used to transmit/receive various signals (e.g., an audio signal, a display signal, etc.). According to an embodiment, the pin SSRXn2 413*b* and the pin SSRXn1 413*a* may be used for super-speed RX of data along with the pin SSRXp2 412*b* and the pin SSRXp1 412*a*.

According to an embodiment, at least one of the ground pins 411*a*, 411*b*, 422*a*, and 422*b* may be selectively connected to the communication module 190 for wireless communication. For example, ground pin A1 422*b* or ground pin B1 422*a*, which are symmetric with each other in a reversible structure, may be connected with an antenna that supports a first frequency band. The ground pin 422*a* or 422*b*, which is connected with an antenna that supports a first frequency band, may be connected with the communication module 190. The ground pin 422b or 422a, which is not connected with an antenna that supports a first frequency band, may release the connection with the communication module 190, or may be connected to a ground. As an example, the ground pin 422a or 422b connected with an antenna that supports a first frequency band, may be determined on the basis of the coupling direction (CC1 or CC2) of the external connector (e.g., the external connector 242 of FIG. 2). For example, ground pin A12 411b or ground pin B12 411a, which are symmetric with each other in a reversible structure, may be connected with an antenna that supports a second frequency band. The ground pin 411a or 411b, connected with an antenna that supports a second frequency band, may be connected with the communication module 190. Ground pin 411b or 411a, which is not connected with an antenna that supports a second frequency band, may release the connection with the communication module 190, or may be connected to a ground. As an example, the first frequency band and the second frequency band may include different frequency bands from each other.

Figure 5A:
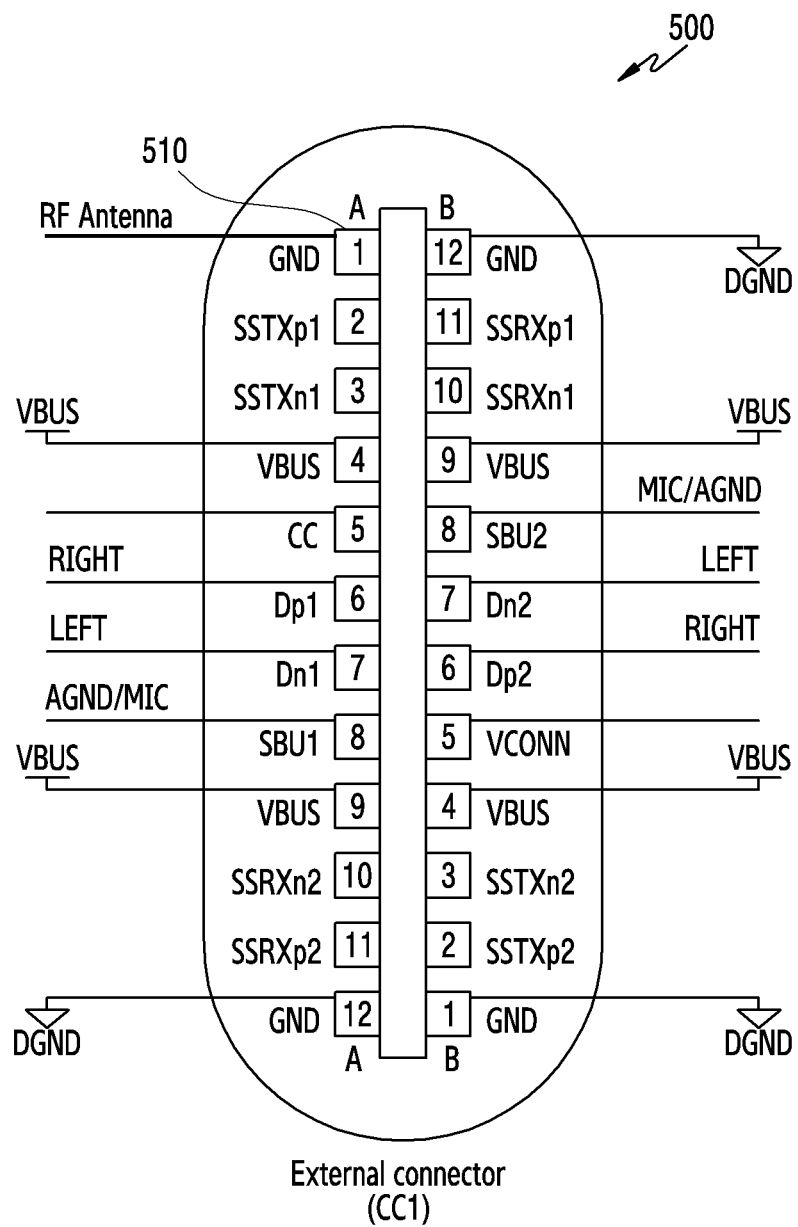
FIGS. 5A to 5D illustrate configurations of a connector and an external connector for connecting an antenna using a first ground pin according to various embodiments of the disclosure.
Figure 5B:
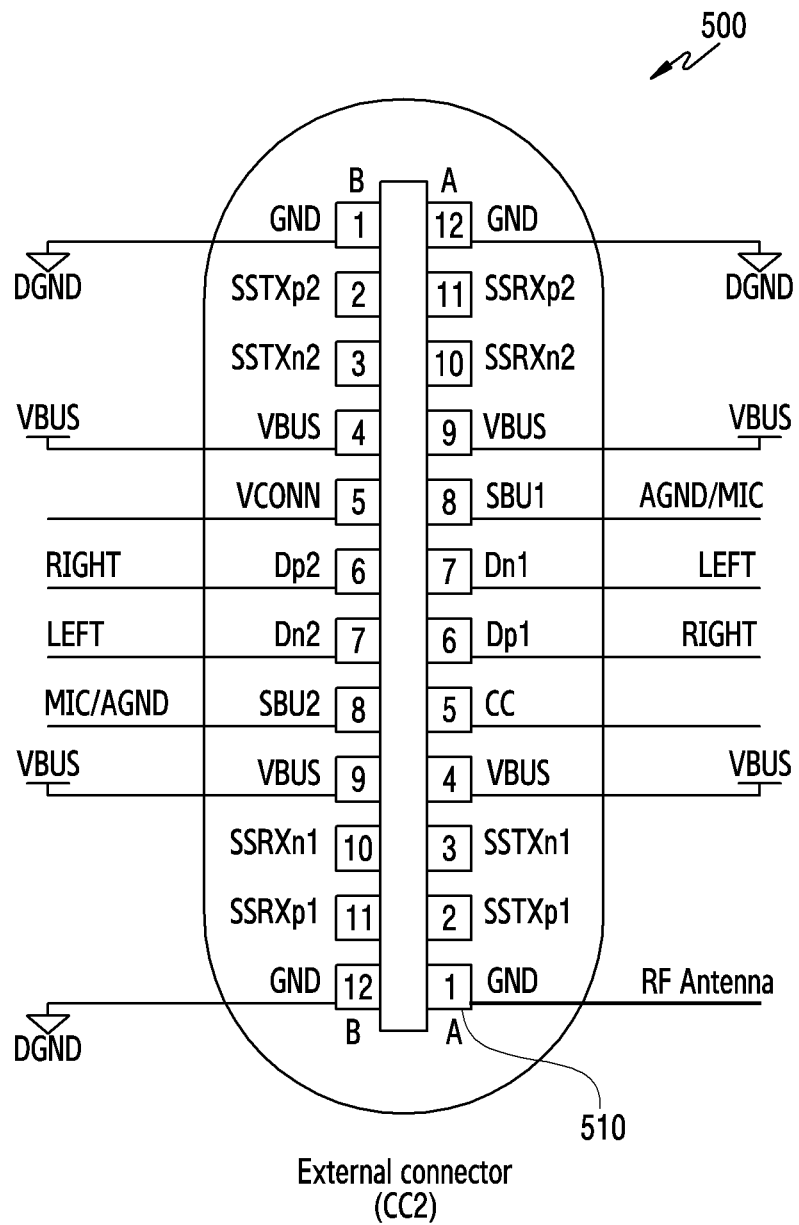
Figure 5C:
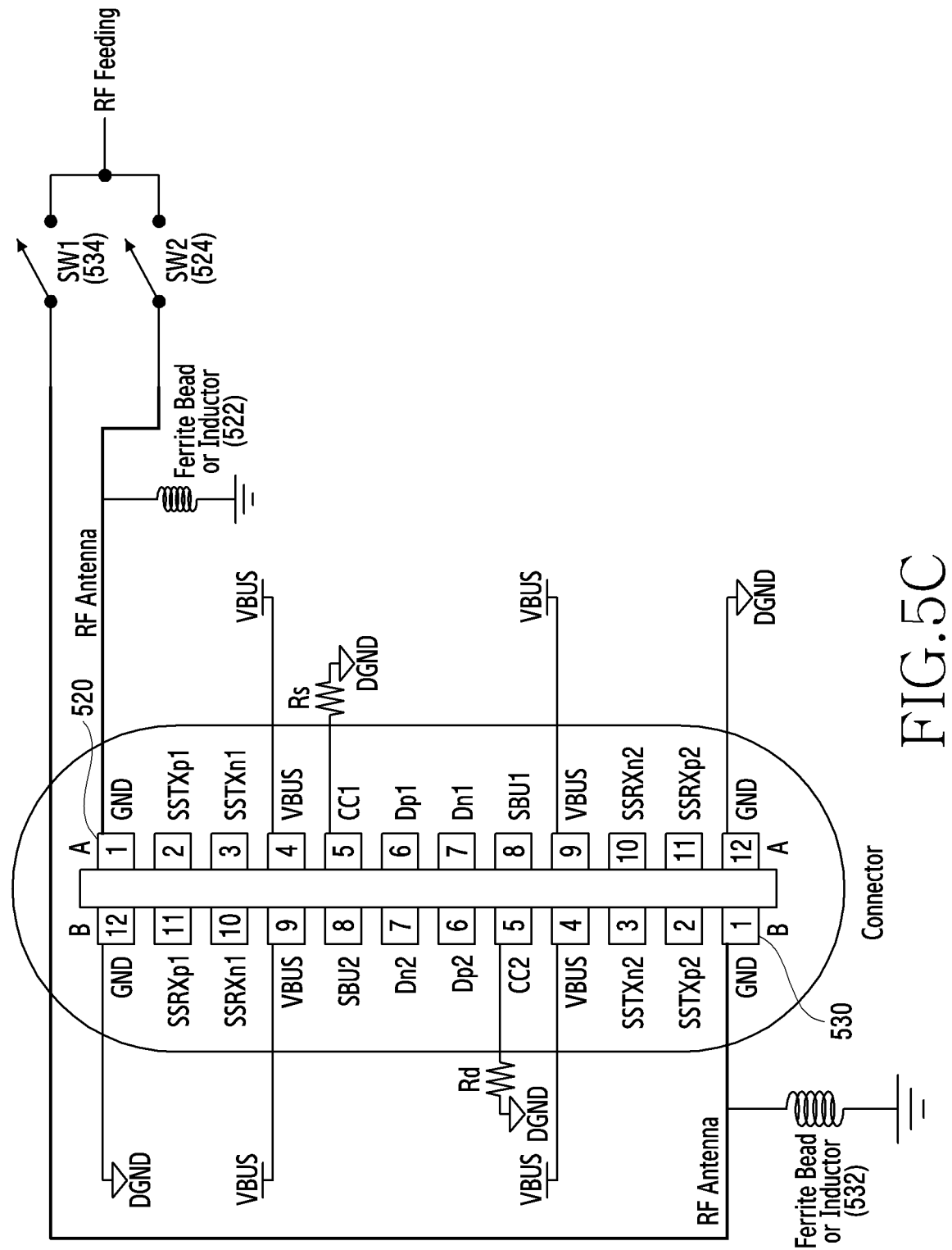

According to various embodiments of the disclosure, one of the four ground pins 411a, 411b, 422a, and 422b of the connector 300 may be used as an antenna port. For example, the ground pin 411a, 411b, 422a, or 422b of the connector 300 may be used as ports for antennas different from each other, as shown in Table 1.

switches 524 and 534, as shown in FIG. 5C. For example, in the case where the connector 300 is coupled with the external connector 500 in the first direction (CC1), as shown in FIG. 5A, the connector 300 may connect ground pin A1 520 with the communication module 190 through the switch 2 (524). Connection of ground pin B1 530 with the communication module 190 may be released by the switch 1 (534). In this case, ground pin A1 520 may prevent an antenna, connected through ground pin A1 520 and a ground, from being short-circuited through a first ferrite bead or inductor 522. Ground pin B1 530 may be operated as a ground through a second ferrite bead or inductor 532. For example, in the case where the connector 300 is coupled with the external connector 500 in the second direction (CC2), as shown in FIG. 5B, the connector 300 may connect ground pin B1 530 with the communication module 190 through the switch 1 (534). Connection of ground pin A1 520 with the communication module 190 may be released by the switch 2 (524). In this case, ground pin B1 530 may prevent an antenna connected through ground pin B1 530 and a ground from being short-circuited through a second ferrite bead or inductor 532. Ground pin A1 520 may be operated as a ground through the first ferrite bead or inductor 522.

Figure 5D:
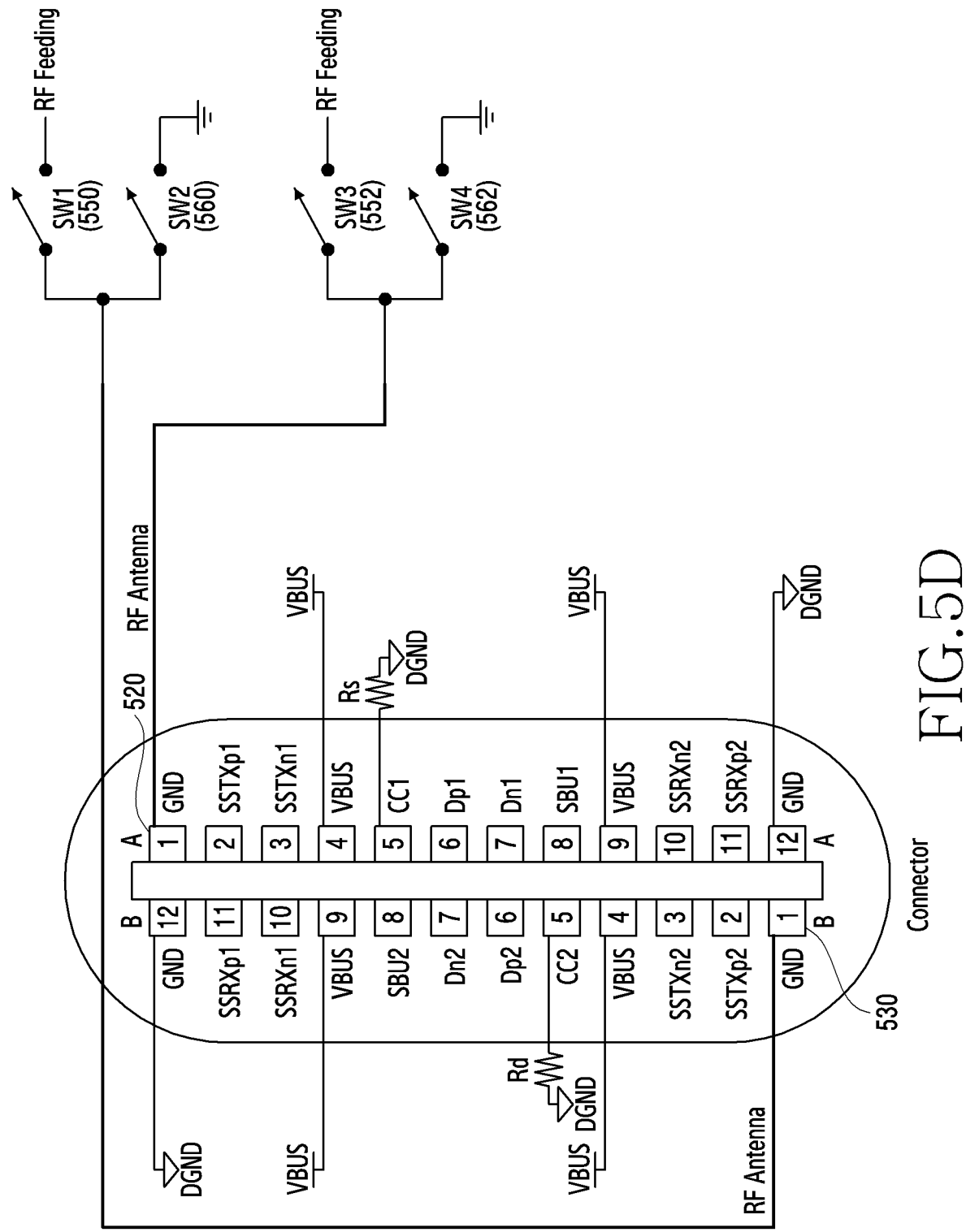

According to an embodiment, as shown in FIG. 5D, the connector 300 may selectively connect ground pin A1 520

TABLE 1

| Plug Pin | USB Name | Digital Audio function | Analog Audio Function | 1st RF Antenna Structure | 2nd RF Antenna Structure | 3rd RF Antenna Structure | 4th RF Antenna Structure |
|---|---|---|---|---|---|---|---|
| A5 | CC | CC1 | | | | | |
| B5 | Vconn | CC2 | | | | | |
| A6/B6 | Dp | DP | Right | | | | |
| A7/B7 | Dn | Dn | Left | | | | |
| A8 | SBU1 | | Mic/AGND | | | | |
| B8 | SBU2 | | AGND/Mic | | | | |
| A1 | DGND | DGND | DGND | RF Antenna | DGND | DGND | DGND |
| B1 | DGND | DGND | DGND | DGND | RF Antenna | DGND | DGND |
| A12 | DGND | DGND | DGND | DGND | DGND | RF Antenna | DGND |
| B12 | DGND | DGND | DGND | DGND | DGND | DGND | RF Antenna |
| A4/A9 B4/B9 others | VBUS | VBUS | | | | | |

FIGS. 5A to 5D illustrate configurations of a connector and an external connector for connecting an antenna using a first ground pin according to various embodiments of the disclosure. In the following description, the configurations of a connector and an external connector for using ground pin A1 510 (pin A1 422b of FIG. 4) in Table 1 as an antenna port will be described. In the following description, the connector 300 may include the connector 300 of FIG. 4.

According to an embodiment, an external connector 500 (e.g., the external connector 242 of FIG. 2) may use ground pin A1 510 as an antenna port, as shown in Table 1. For example, the external connector 500 may be coupled with the connector 300 of the electronic device 101 in the first direction (CC1) as shown in FIG. 5A, or may be coupled with the connector 300 of the electronic device 101 in the second direction (CC2) as shown in FIG. 5B.

According to an embodiment, the connector 300 of the electronic device 101 may connect ground pin A1 520 or ground pin B1 530 to the communication module 190 using and ground pin B1 530 to a communication module 190 or a ground. For example, in the case where the connector 300 is coupled with the external connector 500 in the first direction (CC1), as shown in FIG. 5A, the connector 300 may connect ground pin A1 520 with the communication module 190 through a switch 3 (552). A switch 4 (562) may interrupt the connection of the ground with ground pin A1 520. Ground pin B1 530 may be connected to the ground through a switch 2 (560). For example, in the case where the connector 300 is coupled with the external connector 500 in the second direction (CC2), as shown in FIG. 5B, the connector 300 may connect the ground pin B1 530 with the communication module 190 through a switch 1 (550). The switch 2 (560) may interrupt the connection of the ground with ground pin B1 530. Ground pin A1 520 may be connected to the ground through the switch 4 (562).

FIGS. 6A to 6D illustrate configurations of a connector and an external connector for connecting an antenna using a second ground pin according to various embodiments of the disclosure. In the following description, configurations of a connector and an external connector for using a ground pin B12 610 (pin B12 411a of FIG. 4) in Table 1 as an antenna port will be described. In the following description, the connector 300 may include the connector 300 of FIG. 4.

Figure 6A:
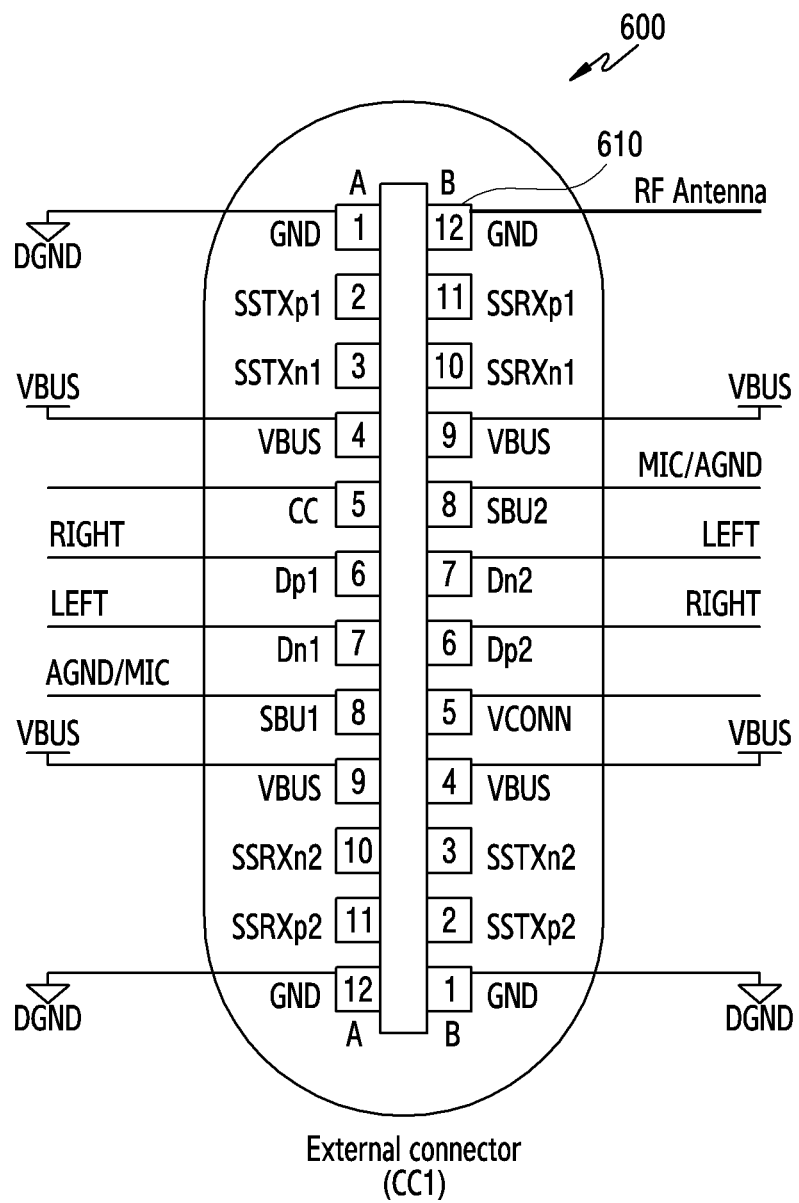
FIGS. 6A to 6D illustrate configurations of a connector and an external connector for connecting an antenna using a second ground pin according to various embodiments of the disclosure.
Figure 6B:
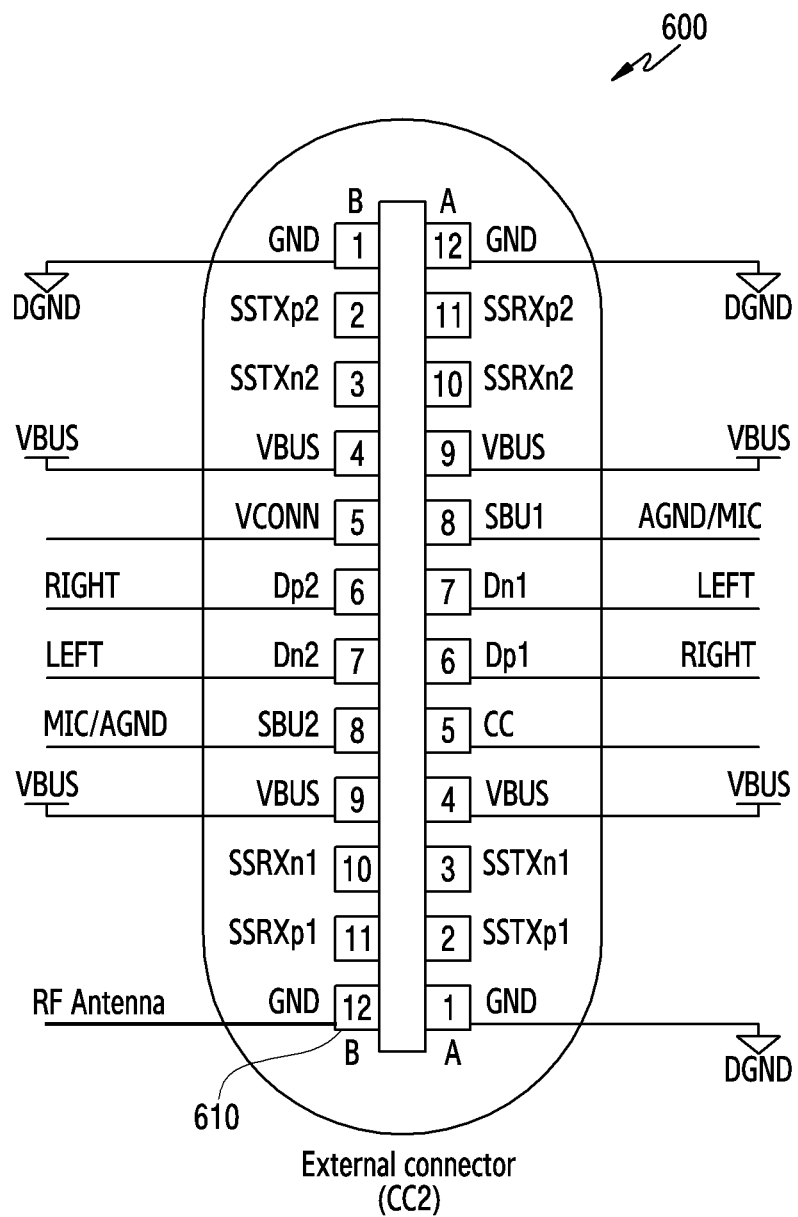

According to an embodiment, an external connector 600 (e.g., the external connector 242 of FIG. 2) may use ground pin B12 610 as an antenna port, as shown in Table 1. For example, the external connector 600 may be coupled with the connector 300 of the electronic device 101 in the first direction (CC1) or the second direction (CC2), as shown in FIGS. 6A and 6B.

Figure 6C:
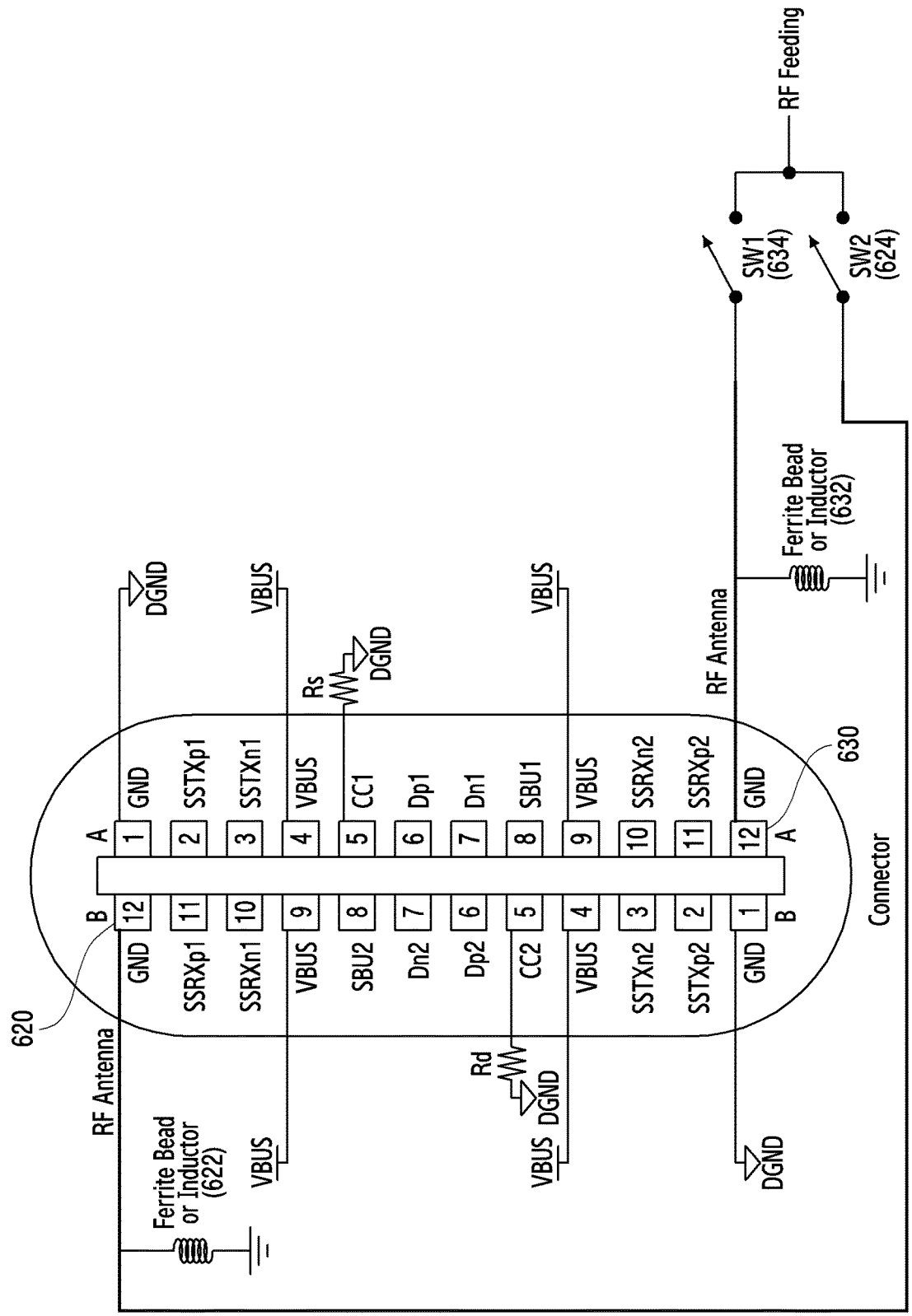

According to an embodiment, the connector 300 of the electronic device 101 may selectively connect a ground pin B12 620 and a ground pin A12 630 to a communication module 190, as shown in FIG. 6C. For example, in the case where the connector 300 is coupled with the external connector 600 in the first direction (CC1), as shown in FIG. 6A, the connector 300 may connect ground pin B12 620 with the communication module 190 through a switch 2 (624). For example, in the case where the connector 300 is coupled with the external connector 600 in the second direction (CC2), as shown in FIG. 6B, the connector 300 may connect ground pin A12 630 with the communication module 190 through the switch 1 (634). According to an embodiment, the connector 300 may include a ferrite bead or inductor 622 corresponding to ground pin B12 620 and a ferrite bead or inductor 632 corresponding to ground pin A12 630.

Figure 6D:
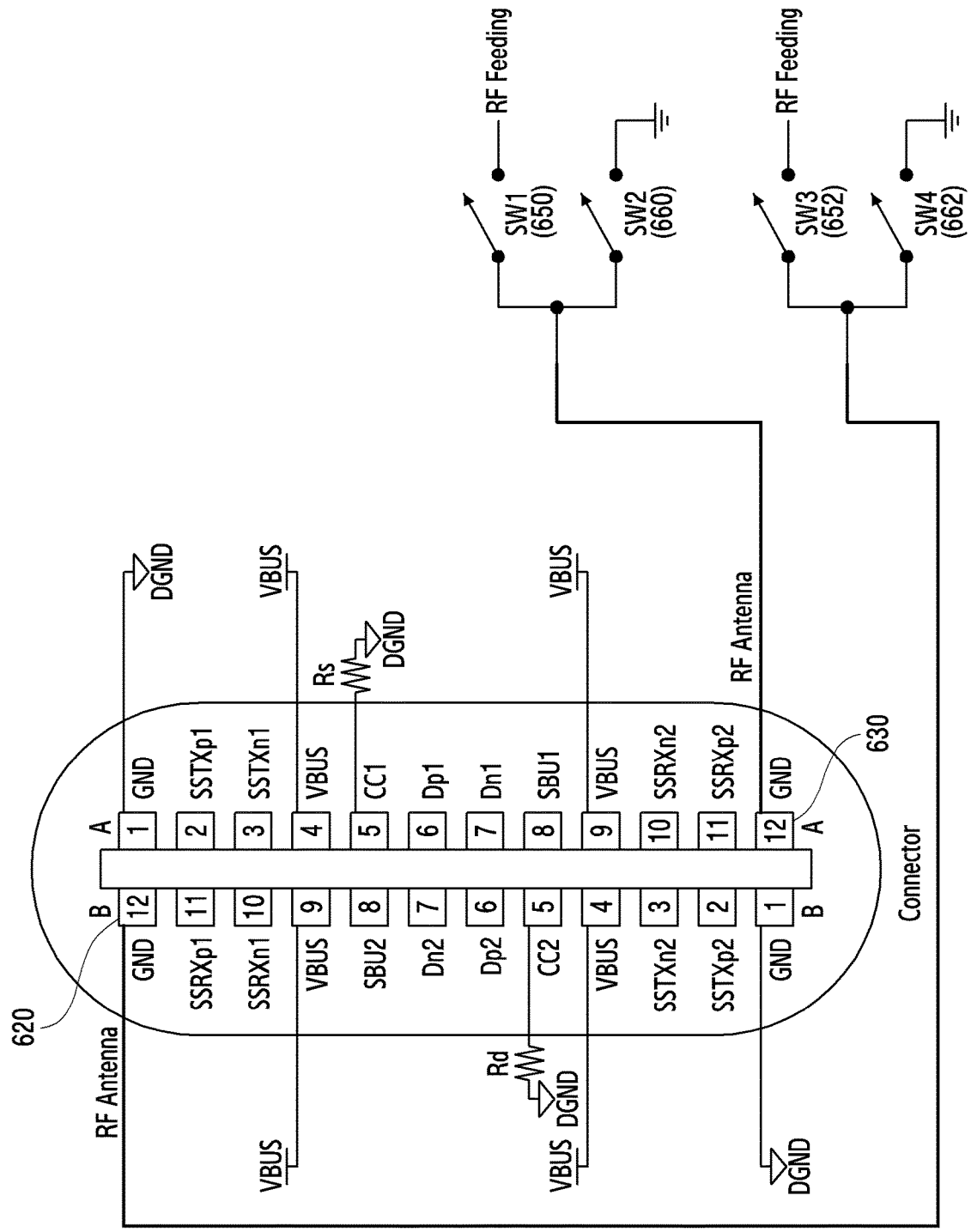

According to an embodiment, the connector 300 may connect ground pin B12 620 and ground pin A12 630 to the communication module 190 or a ground, as shown in FIG. 6D. For example, in the case where the connector 300 is coupled with the external connector 600 in the first direction (CC1), as shown in FIG. 6A, ground pin B12 620 and the communication module 190 may be connected through a switch 3 (652). A switch 2 (660) may connect ground pin A12 630 and the ground. For example, in the case where the connector 300 is coupled with the external connector 600 in the second direction (CC2), as shown in FIG. 6B, ground pin A12 630 and the communication module 190 may be connected through a switch 1 (650). A switch 4 (662) may connect ground pin B12 620 and the ground.

According to various embodiments of the disclosure, among the four ground pins 411a, 411b, 422a, and 422b of the connector 300, the two neighboring ground pins 411a and 422b, or 411b and 422a, may be used as antenna ports. For example, the neighboring ground pins 411a and 422b or 411b and 422a of the connector 300 may be used as ports for antennas of frequency bands different from each other, as shown in Table 2.

TABLE 2

| Plug Pin | USB Name | Digital Audio function | Analog Audio Function | 1st RF Antenna Structure | 2nd RF Antenna Structure |
|---|---|---|---|---|---|
| A5 | CC | CC1 | | | |
| B5 | Vconn | CC2 | | | |
| A6/B6 | Dp | Dp | Right | | |
| A7/B7 | Dn | Dn | Left | | |
| A8 | SBU1 | | Mic/AGND | | |
| B8 | SBU2 | | AGND/Mic | | |
| A1 | DGND | DGND | DGND | RF Antenna | DGND |
| B1 | DGND | DGND | DGND | DGND | RF Antenna |
| A12 | DGND | DGND | DGND | DGND | RF Antenna |
| B12 | DGND | DGND | DGND | RF Antenna | DGND |
| A4/A9 B4/B9 others | VBUS | VBUS | | | |

FIGS. 7A to 7E illustrate configurations of a connector and an external connector for connecting an antenna using two neighboring ground pins according to various embodiments of the disclosure. In the following description, configurations of a connector and an external connector for using ground pin A1 710 (pin A1 422b of FIG. 4) and ground pin B12 712 (pin B12 411a of FIG. 4) in Table 2 as antenna ports will be described. In the following description, the connector 300 may include the connector 300 of FIG. 4.

Figure 7A:
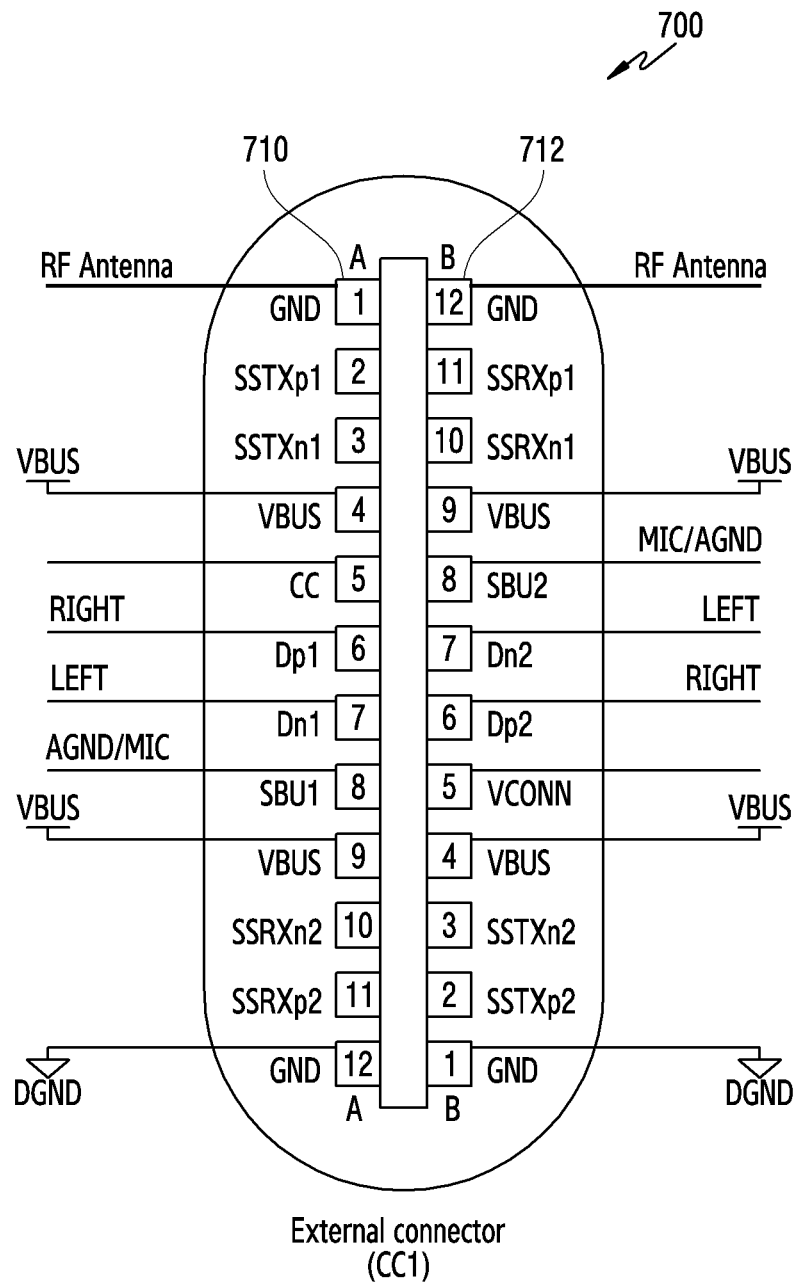
FIGS. 7A to 7E illustrate configurations of a connector and an external connector for connecting an antenna using two neighboring ground pins according to various embodiments of the disclosure.
Figure 7B:
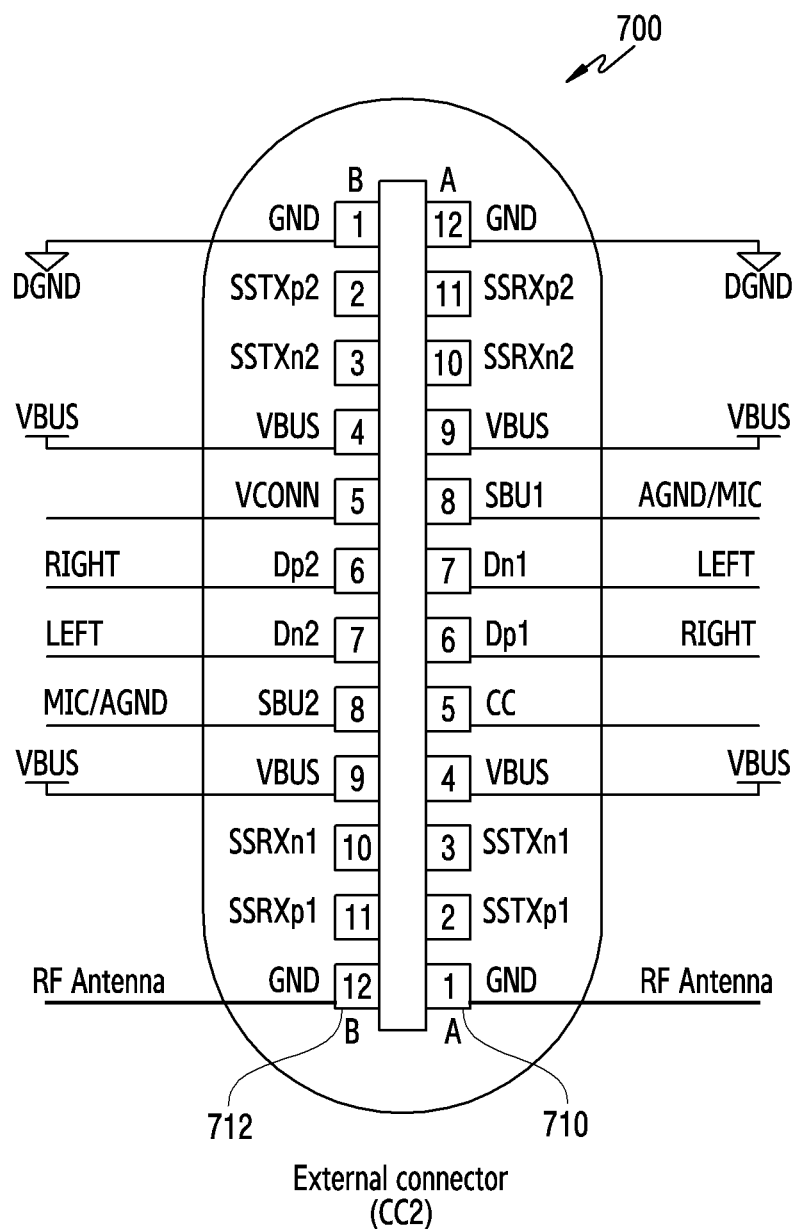

According to an embodiment, an external connector 700 (e.g., the external connector 242 of FIG. 2) may use ground pin A1 710 and ground pin B12 712 as antenna ports, as shown in Table 2. For example, the external connector 700 may be coupled with the connector 300 of the electronic device 101 in the first direction (CC1) or the second direction (CC2), as shown in FIG. 7A or 7B.

Figure 7C:
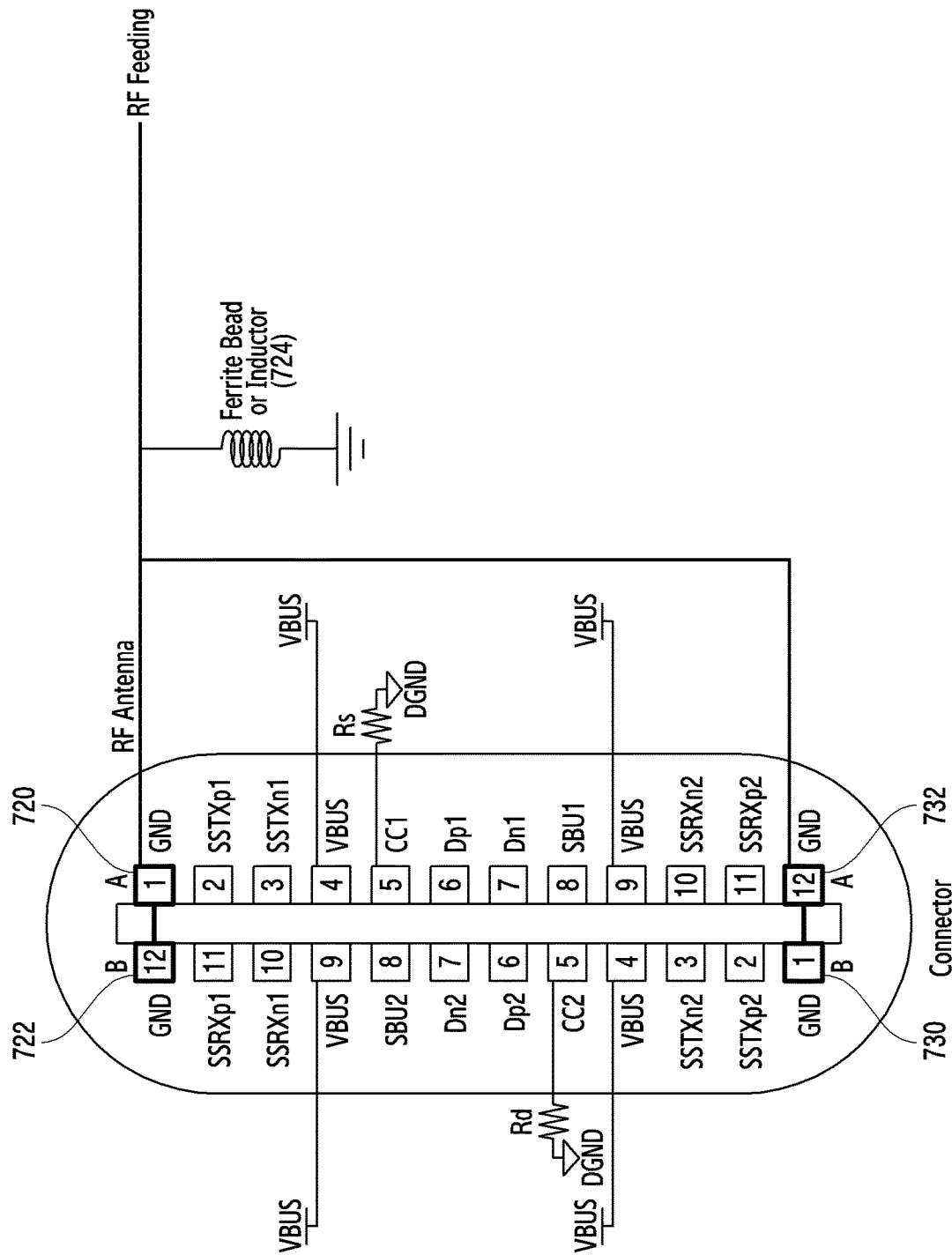

According to an embodiment, as shown in FIG. 7C, the connector 300 of the electronic device 101 may use ground pin A1 720, ground pin A12 732 (pin A12 411b of FIG. 4), ground pin B1 730 (pin B1 422a of FIG. 4), and ground pin B12 722 as antenna ports for connection with an external device (an antenna) in the first direction (CC1) or the second direction (CC2). For example, the connector 300 may be connected with the external device (the antenna) through at least one of the ground pins 720, 722, 730, and 732 connected with the communication module 190.

According to an embodiment, the connector 300 may include a ferrite bead or inductor 724 that is disposed in a channel along which the communication module 190 and the ground pins 720, 722, 730, and 732 are connected.

Figure 7D:
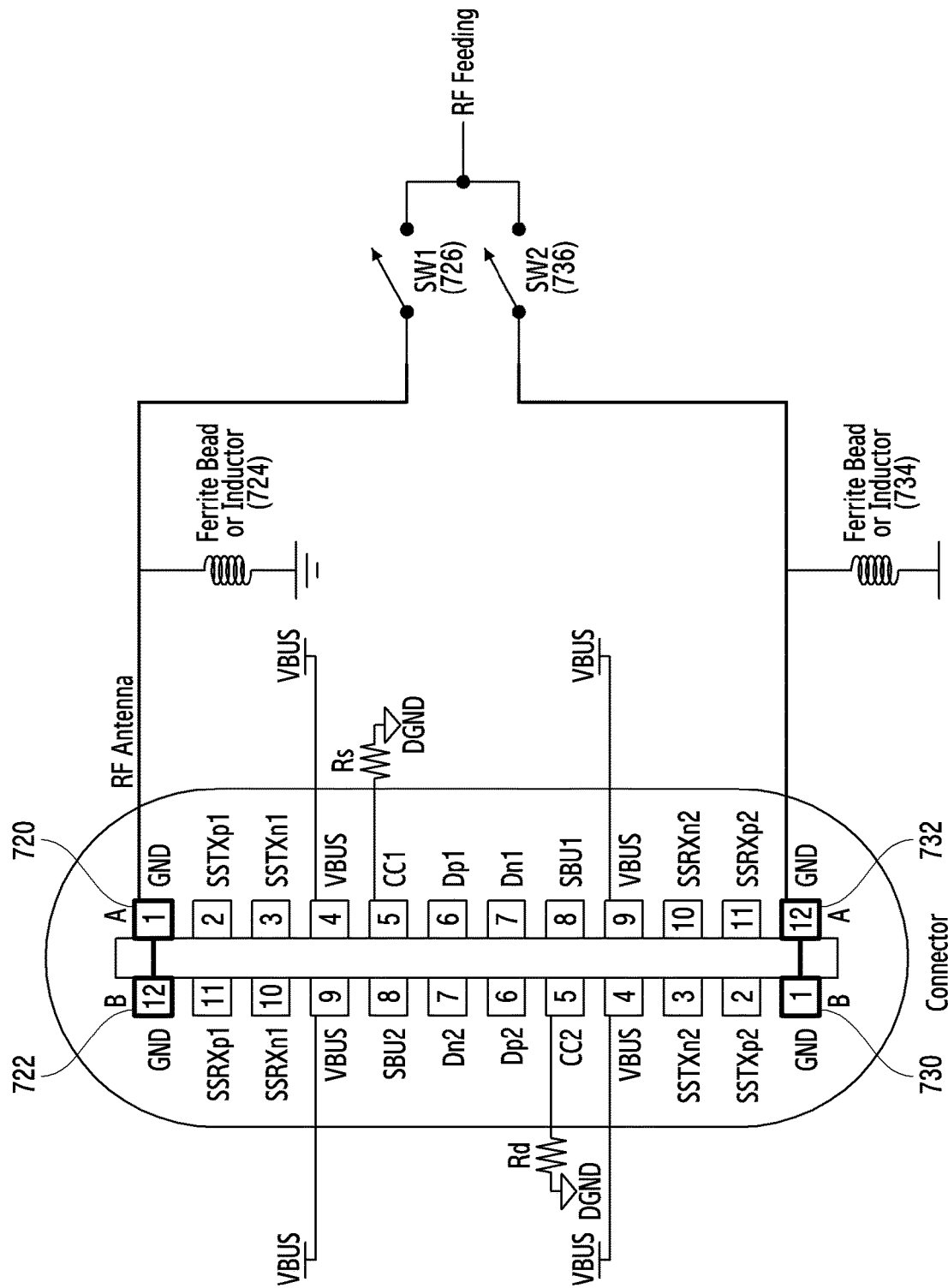

According to an embodiment, as shown in FIG. 7D, the connector 300 may selectively connect ground pin A1 720 and ground pin B12 722, or ground pin B1 730 and ground pin A12 732, to a communication module 190. For example, in the case where the connector 300 is coupled with the external connector 700 in the first direction (CC1), as shown in FIG. 7A, ground pin A1 720 and ground pin B12 722 may be connected to the communication module 190 through a switch 1 (726). For example, in the case where the connector 300 is coupled with the external connector 700 in the second direction (CC2) as shown in FIG. 7B, ground pin B1 730 and ground pin A12 732 may be connected to the communication module 190 through a switch 2 (736).

According to an embodiment, a ferrite bead or inductor 724 may be disposed in a channel for ground pin A1 720 and ground pin B12 722 and the communication module 190. A ferrite bead or inductor 734 may be disposed in a channel for ground pin B1 730 and ground pin A12 732 and the communication module 190.

Figure 7E:
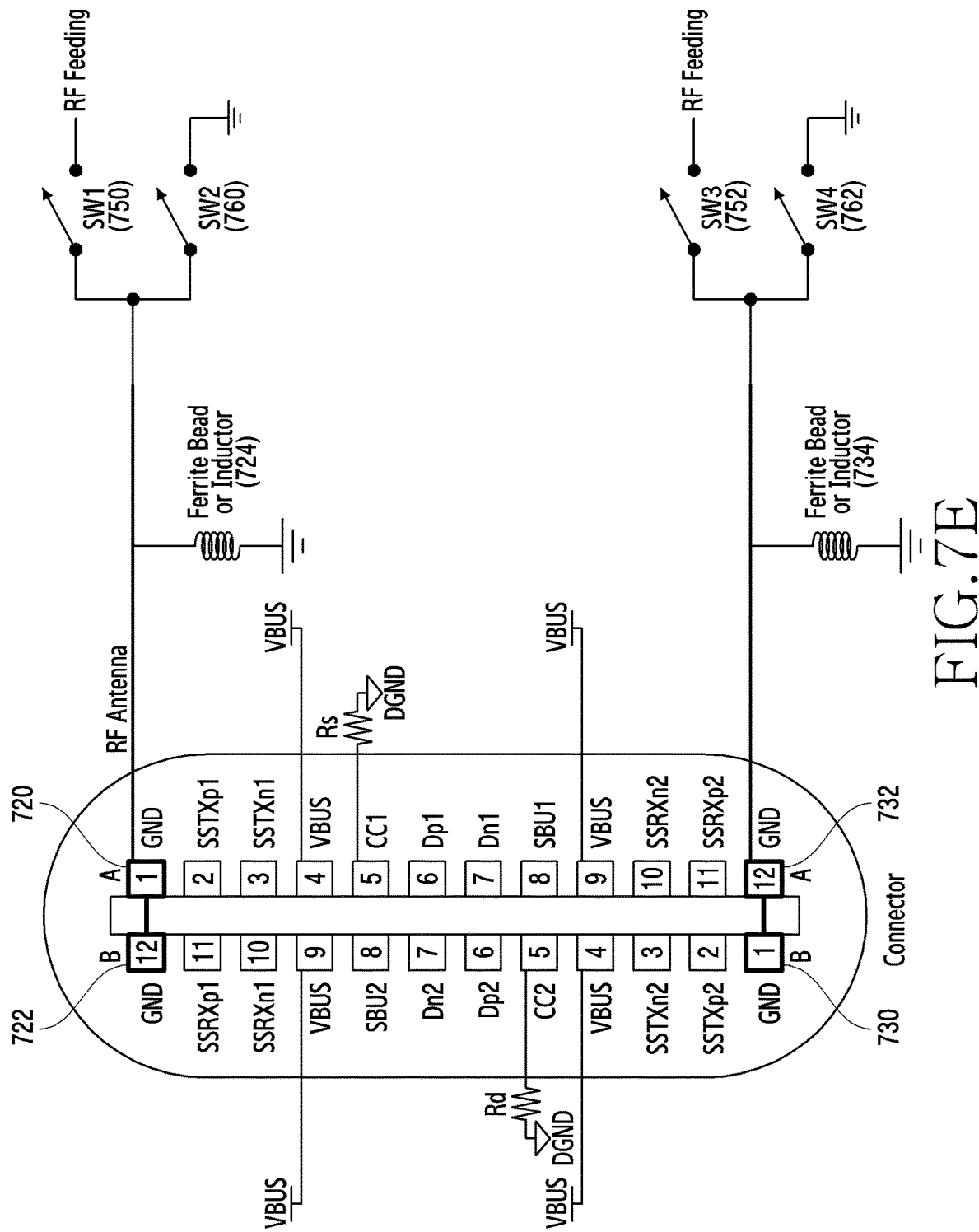

According to an embodiment, as shown in FIG. 7E, the connector 300 may selectively connect ground pin A1 720 and ground pin B12 722, or ground pin B1 730 and ground pin A12 732, to a communication module 190 or a ground. For example, in the case where the connector 300 is coupled with the external connector 700 in the first direction (CC1), as shown in FIG. 7A, ground pin A1 720 and ground pin B12 722 may be connected to the communication module 190 through a switch 1 (750). Ground pin B1 730 and ground pin A12 732 may be connected to the ground through a switch 4 (762). For example, in the case where the connector 300 is coupled with the external connector 700 in the second direction (CC2), as shown in FIG. 7B, ground pin B1 730 and ground pin A12 732 may be connected to the communication module 190 through a switch 3 (752). Ground pin A1 720 and ground pin B12 722 may be connected to the ground through a switch 2 (760).

According to various embodiments of the disclosure, among the four ground pins 411a, 411b, 422a, and 422b of the connector 300, two ground pins 411a and 411b or 422b and 422a that correspond to each other in a reversible structure may be used as antenna ports. For example, the ground pins 411a and 411b or 422b and 422a of the connector 300, which correspond to each other, may be used as ports for antennas of frequency bands different from each other, as shown in Table 3.

TABLE 3

| Plug Pin | USB Name | Digital Audio function | Analog Audio Function | 1st RF Antenna Structure | 2nd RF Antenna Structure |
|---|---|---|---|---|---|
| A5 | CC | CC1 | | | |
| B5 | Vconn | CC2 | | | |
| A6/B6 | Dp | Dp | Right | Right | Right |
| A7/B7 | Dn | Dn | Left | Left | Left |
| A8 | SBU1 | | Mic/AGND | Mic/AGND | Mic/AGND |
| B8 | SBU2 | | AGND/Mic | AGND/Mic | AGND/Mic |
| A1 | DGND | DGND | DGND | RF Antenna | DGND |
| B1 | DGND | DGND | DGND | RF Antenna | DGND |
| A12 | DGND | DGND | DGND | DGND | RF Antenna |
| B12 | DGND | DGND | DGND | DGND | RF Antenna |
| A4/A9 | VBUS | VBUS | | | |
| B4/B9 others | | | | | |

Figure 8A:
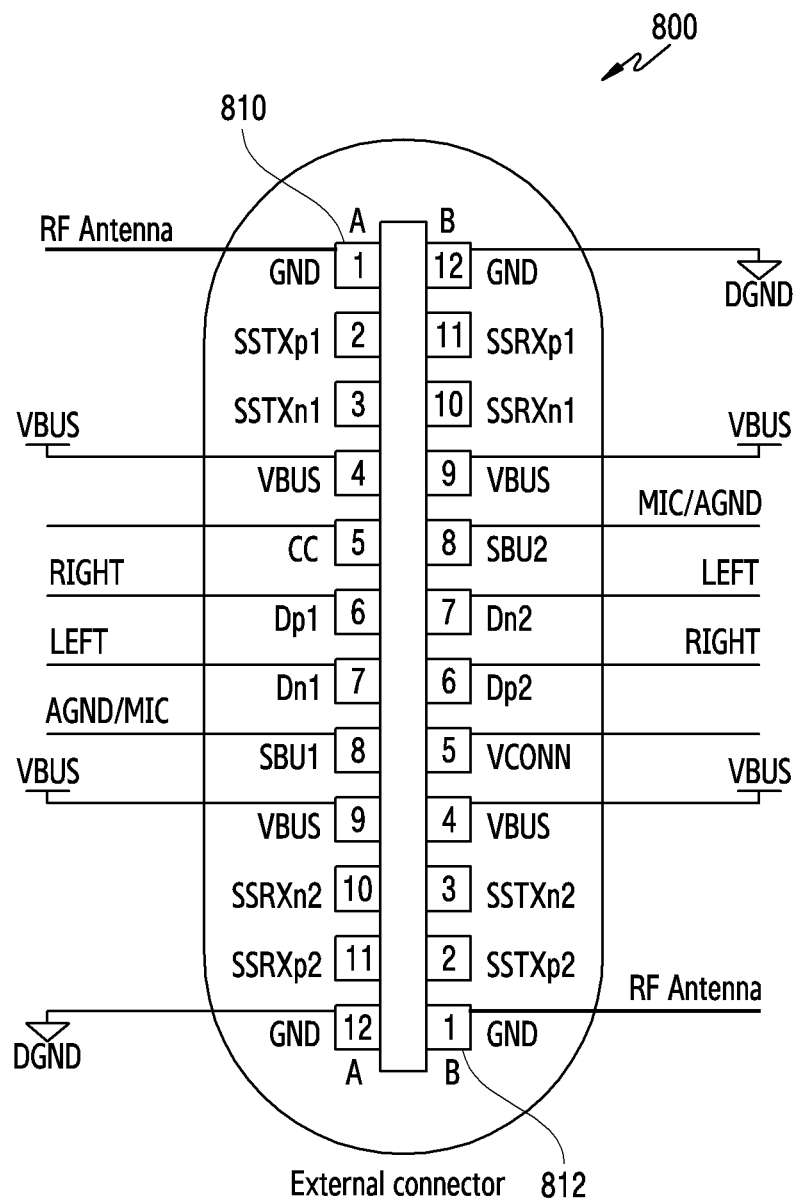
FIGS. 8A to 8C illustrate configurations of a connector and an external connector for connecting an antenna using symmetric ground pins A1 and B1 according to various embodiments of the disclosure.
Figure 8B:
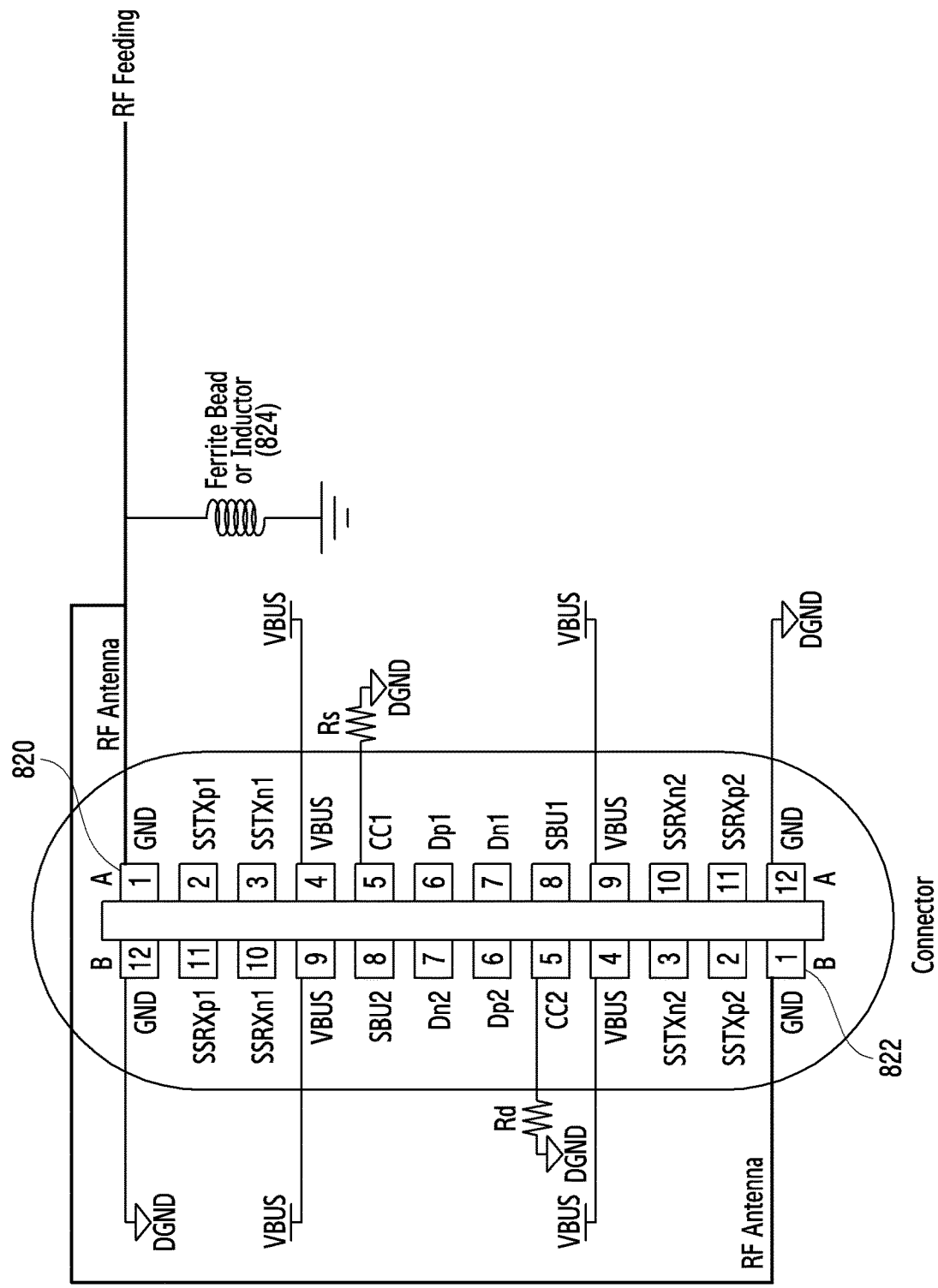
Figure 8C:
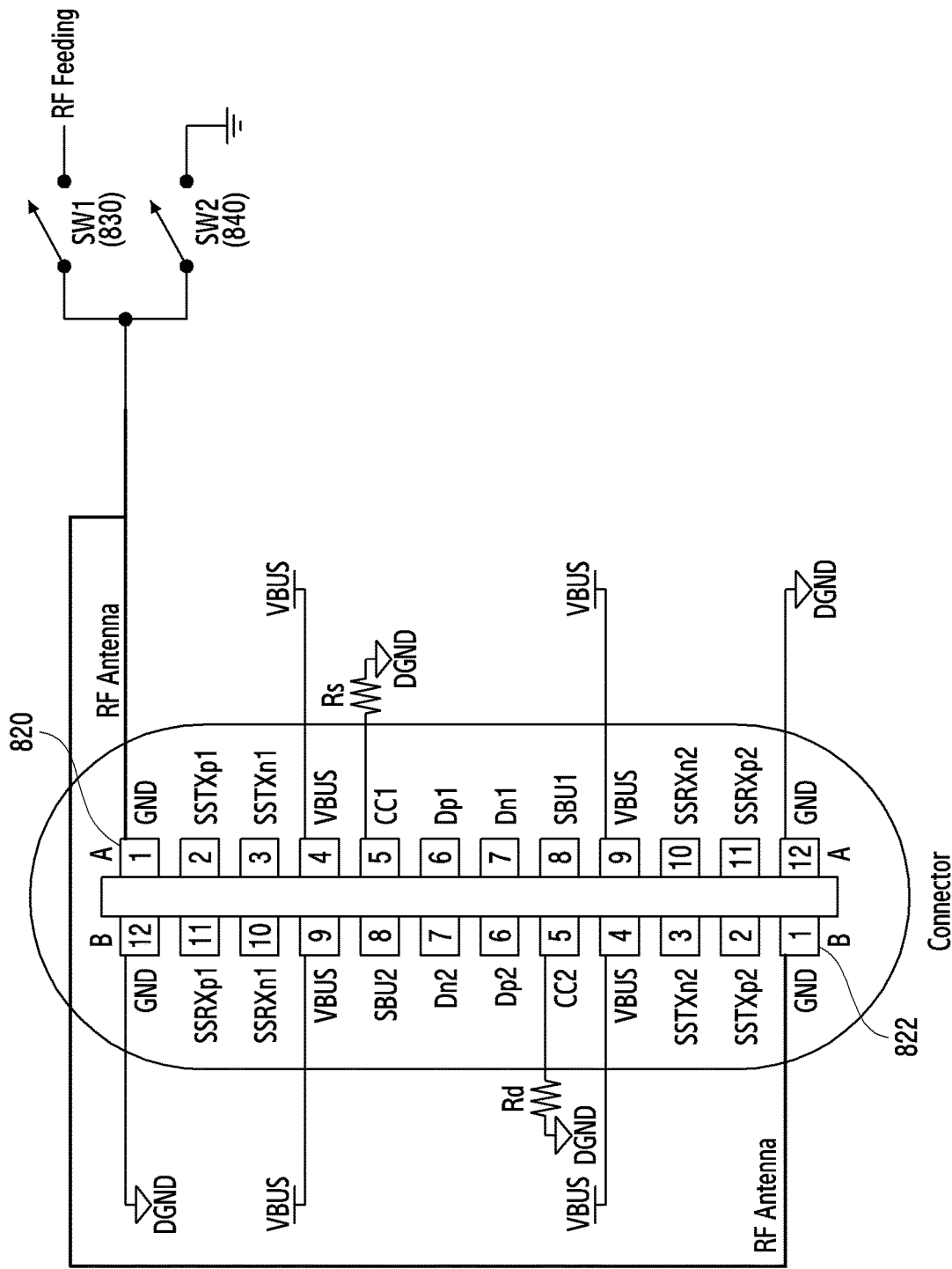

FIGS. 8A to 8C illustrate configurations of a connector and an external connector for connecting an antenna using symmetric ground pins A1 and B1 according to various embodiments of the disclosure. In the following description, configurations of a connector and an external connector for using ground pin A1 810 (pin A1 422b of FIG. 4) and ground pin B1 812 (pin B1 422a of FIG. 4) in Table 3 as antenna ports will be described. In the following description, the connector 300 may include the connector 300 of FIG. 4.

According to an embodiment, as shown in FIG. 8A, an external connector 800 (e.g., the external connector 242 of FIG. 2) may use ground pin A1 810 and ground pin B1 812 as antenna ports. For example, since the antenna ports of the external connector 800 are disposed in a reversible structure, the antenna ports of the external connector 800 may be disposed in the same way regardless of the direction of coupling (CC1 or CC2) with the connector 300 of the electronic device 101.

According to an embodiment, as shown in FIG. 8B, the connector 300 of the electronic device 101 may use ground pin A1 820 and ground pin B1 822 as antenna ports such that an external device (an antenna) is connected to the communication module 190 regardless of the direction of coupling (CC1 or CC2) with the external device (the antenna). For example, the connector 300 may be connected with the external device (the antenna) through at least one of ground pin A1 820 or ground pin B1 822 connected with the communication module 190. According to an embodiment, the connector 300 may include a ferrite bead or inductor 824 to prevent a short circuit with a ground at an RF frequency and to function as a ground at an audio frequency. The connector 300 can stabilize VBUS power and reduce the influence of a charge current through the ferrite bead or inductor 824.

According to an embodiment, as shown in FIG. 8C, the connector 300 may selectively connect ground pin A1 820 or ground pin B1 822 to a communication module 190 or a ground. For example, in the case where the connector 300 is coupled with the external connector 800 through at least one of ground pin A1 820 or ground pin B1 822, ground pin A1 820 and ground pin B1 822 may be connected to the communication module 190 through a switch 1 (830). For example, in the case where the connector 300 is not coupled with the external connector 800 through at least one of ground pin A1 820 or ground pin B1 822, ground pin A1 820 and ground pin B1 822 may be connected to the ground through a switch 2 (840).

Figure 9A:
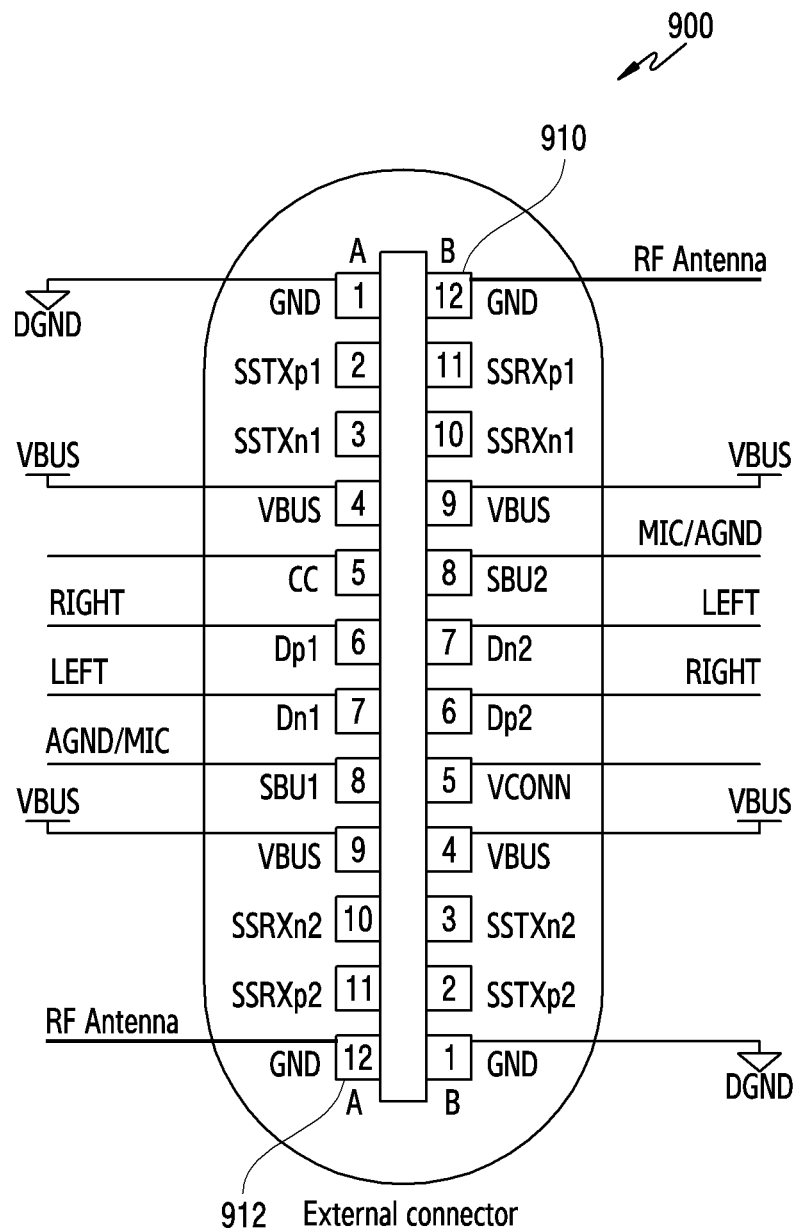
FIGS. 9A to 9C illustrate configurations of a connector and an external connector for connecting an antenna using symmetric ground pins A12 and B12 according to various embodiments of the disclosure.
Figure 9B:
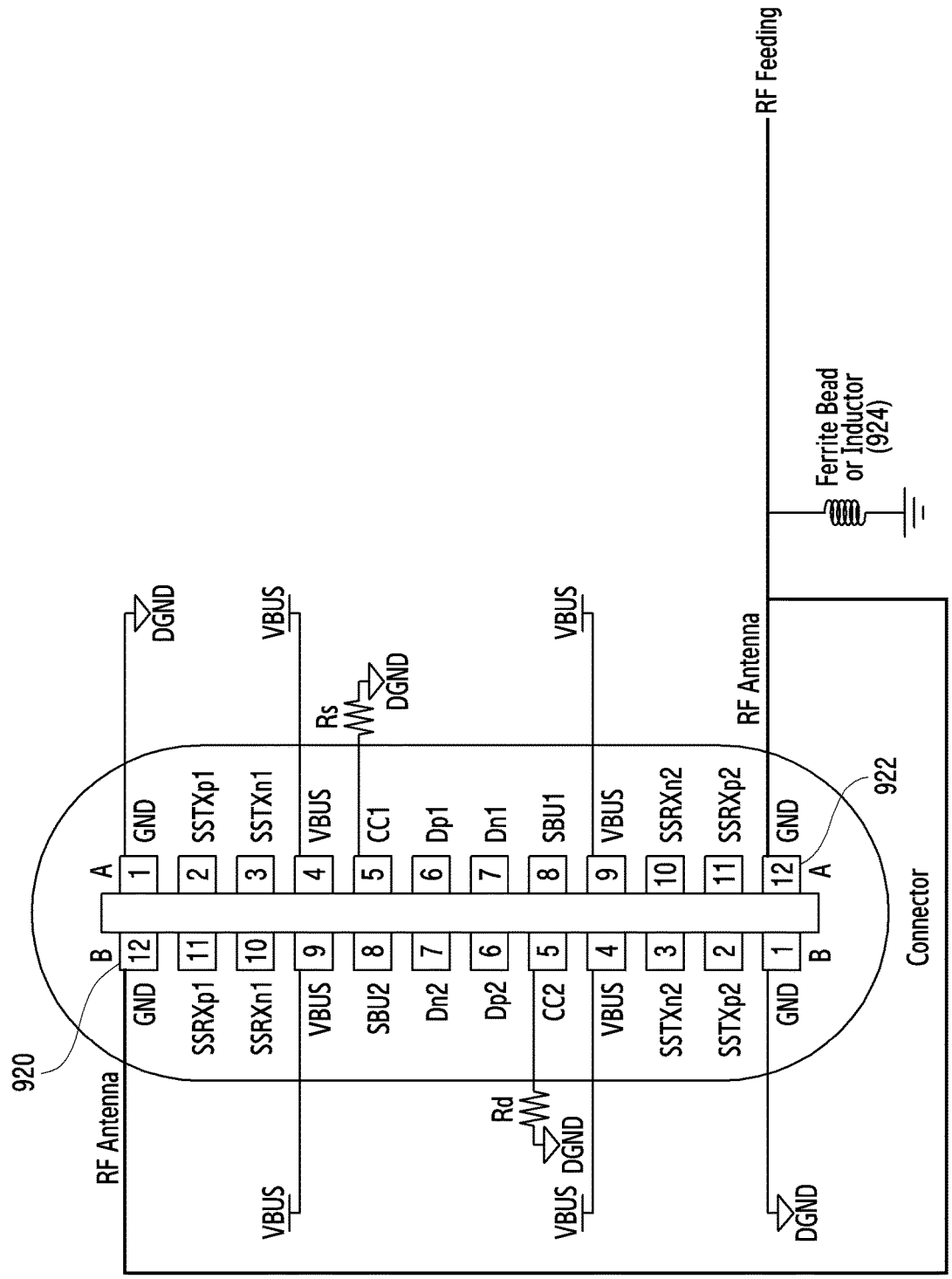
Figure 9C:
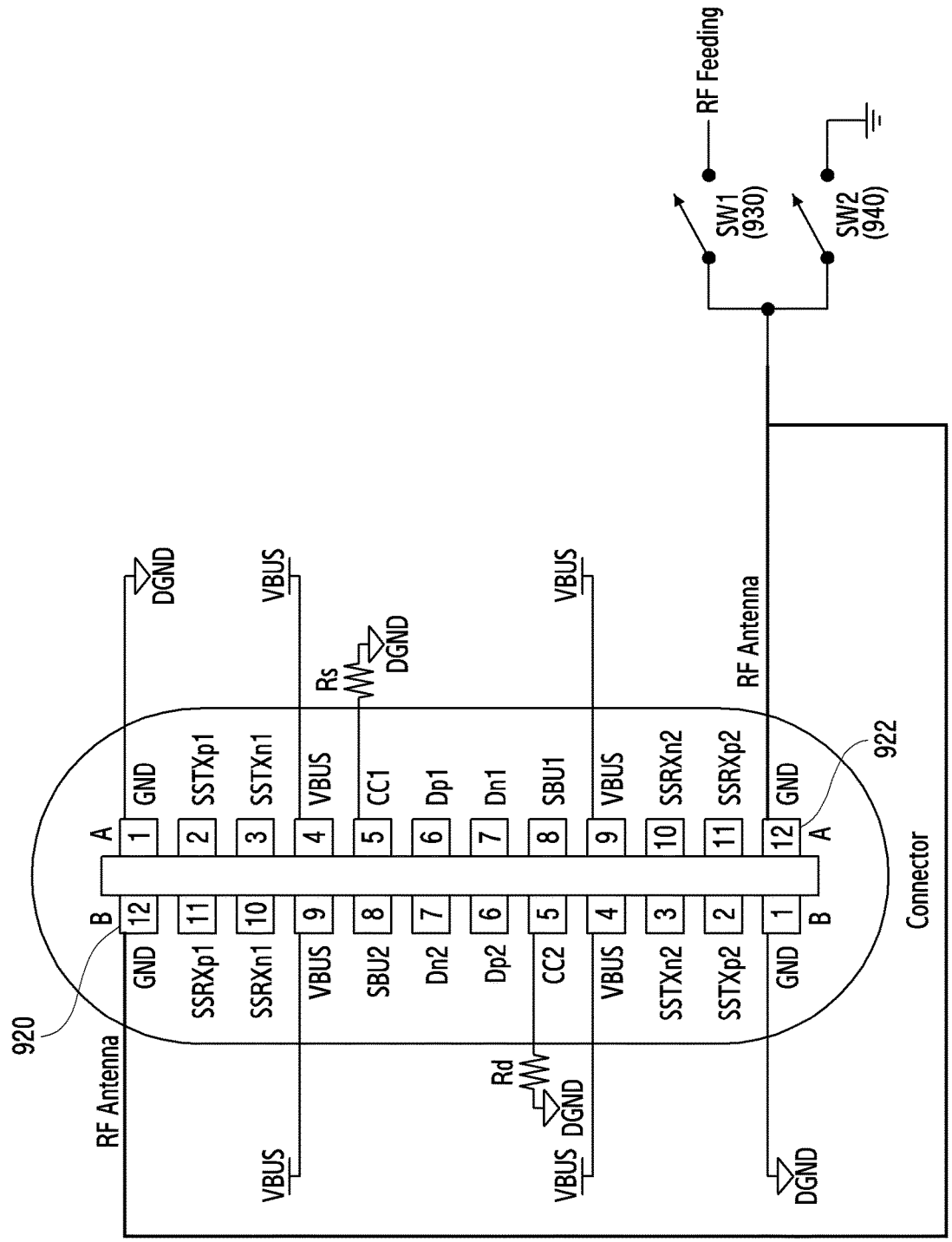

FIGS. 9A to 9C illustrate configurations of a connector and an external connector for connecting an antenna using symmetric ground pins A12 and B12 according to various embodiments of the disclosure. In the following description, configurations of a connector and an external connector for using a ground pin B12 910 (pin B12 411a of FIG. 4) and a ground pin A12 912 (pin A12 411b of FIG. 4) in Table 3 as antenna ports will be described. In the following description, the connector 300 may include the connector 300 of FIG. 4.

According to an embodiment, as shown in FIG. 9A, an external connector 900 (e.g., the external connector 242 of FIG. 2) may use ground pin B12 910 and ground pin A12 912 as antenna ports. For example, since ground pin B12 910 and ground pin A12 912 are disposed in a reversible structure, the antenna ports may be disposed in the same way regardless of the direction of coupling (CC1 or CC2) with the connector 300 of the electronic device 101.

According to an embodiment, as shown in FIG. 9B, the connector 300 of the electronic device 101 may use a ground pin B12 920 and a ground pin A12 922 as antenna ports for connection with an external connector 900 of an external device (an antenna) in the first direction (CC1) or the second direction (CC2). For example, ground pin B12 920 and ground pin A12 922 of the connector 300 coupled with the external connector 900 of the external device (the antenna) may be connected with the communication module 190.

According to an embodiment, a ferrite bead or inductor 924 may be disposed in a channel between ground pin B12 920 and ground pin A12 922 and the communication module 190.

According to an embodiment, as shown in FIG. 9C, the connector 300 may selectively connect ground pin B12 920 and ground pin A12 922 to a communication module 190 or a ground. For example, in the case where the connector 300 is coupled with the external connector 900 through ground pin B12 920 and ground pin A12 922, ground pin B12 920 and ground pin A12 922 may be connected to the communication module 190 through a switch 1 (930). For example, in the case where the connector 300 is not coupled with the external connector 900 through ground pin B12 920 and ground pin A12 922, ground pin B12 920 and ground pin A12 922 may be connected to the ground through a switch 2 (940).

FIGS. 10A to 10E illustrate configurations of a connector and an external connector for connecting a multiband antenna according to various embodiments of the disclosure. In the following description, the connector 300 may include the connector 300 of FIG. 4.

Figure 10A:
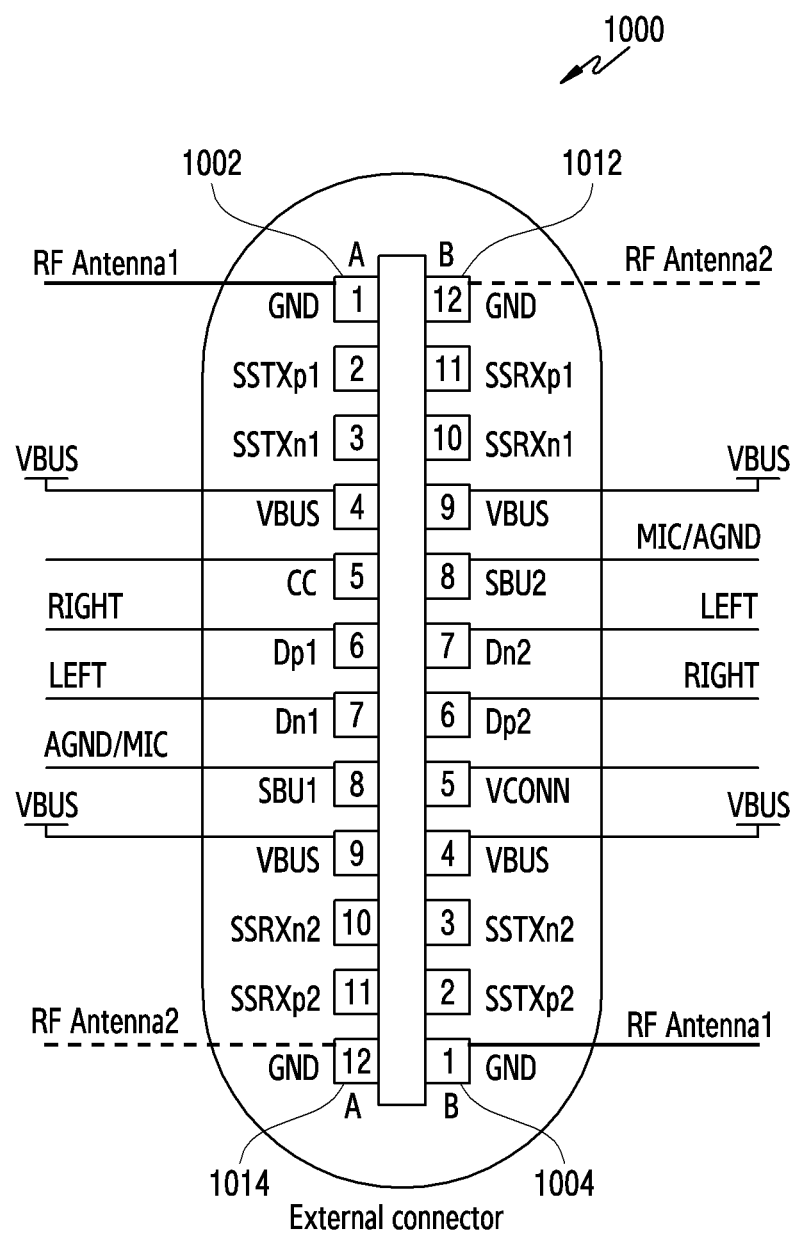
FIGS. 10A to 10E illustrate configurations of a connector and an external connector for connecting a multiband antenna according to various embodiments of the disclosure.

According to an embodiment, as shown in FIG. 10A, an external connector 1000 (e.g., the external connector 242 of FIG. 2) may use at least one of ground pin A1 1002 or ground pin B1 1004 as an antenna port of a first frequency band. The external connector 1000 may use at least one of a ground pin B12 1012 or a ground pin A12 1014 as an antenna port of a second frequency band. As an example, the first frequency band may include any one of a DMB frequency band (174 to 216 MHz), a DVB/DAB frequency band (174 to 240 MHz, 470 to 862 MHz, or 1452 to 1492 MHz), an ISDB-T frequency band (470 to 862 MHz) or an FM frequency band (76 to 108 MHz), and the second frequency band may include another one of the frequency bands.

Figure 10B:
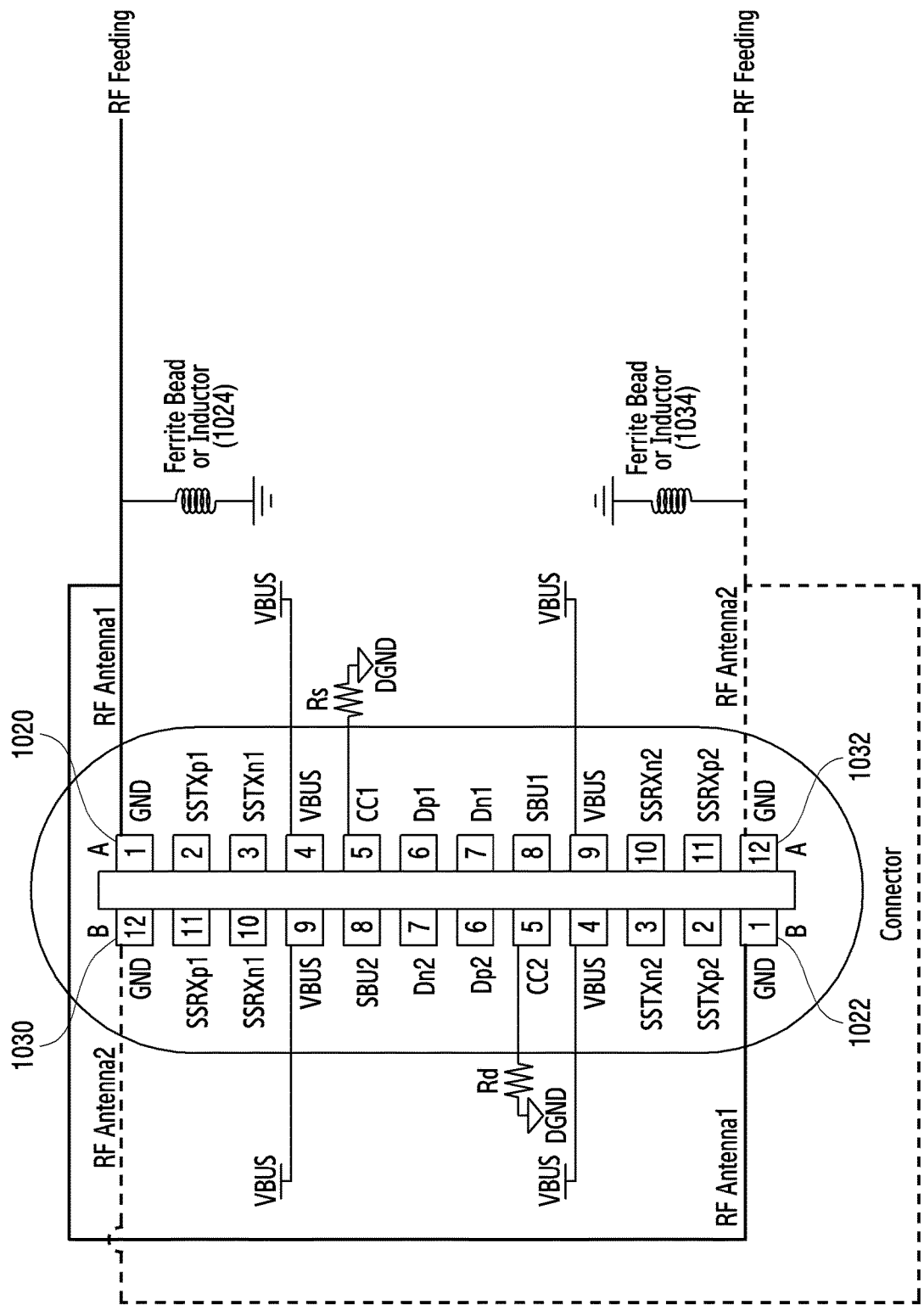

According to an embodiment, as shown in FIG. 10B, the connector 300 of the electronic device 101 may use ground pin A1 1020 (e.g., pin A1 422b of FIG. 4) and ground pin B1 1022 (e.g., pin B1 422a of FIG. 4) as antenna ports for the first frequency band. According to an embodiment, the connector 300 of the electronic device 101 may use a ground pin B12 1030 (e.g., pin B12 411a of FIG. 4) and a ground pin A12 1032 (e.g., pin A12 411b of FIG. 4) as antenna ports for the second frequency band.

According to an embodiment, a first ferrite bead or inductor 1024 may be disposed in a channel between ground pin A1 1020 and ground pin B1 1022 and the communication module 190. A second ferrite bead or inductor 1034 may be disposed in a channel between ground pin B12 1030 and ground pin A12 1032 and the communication module 190.

Figure 10C:
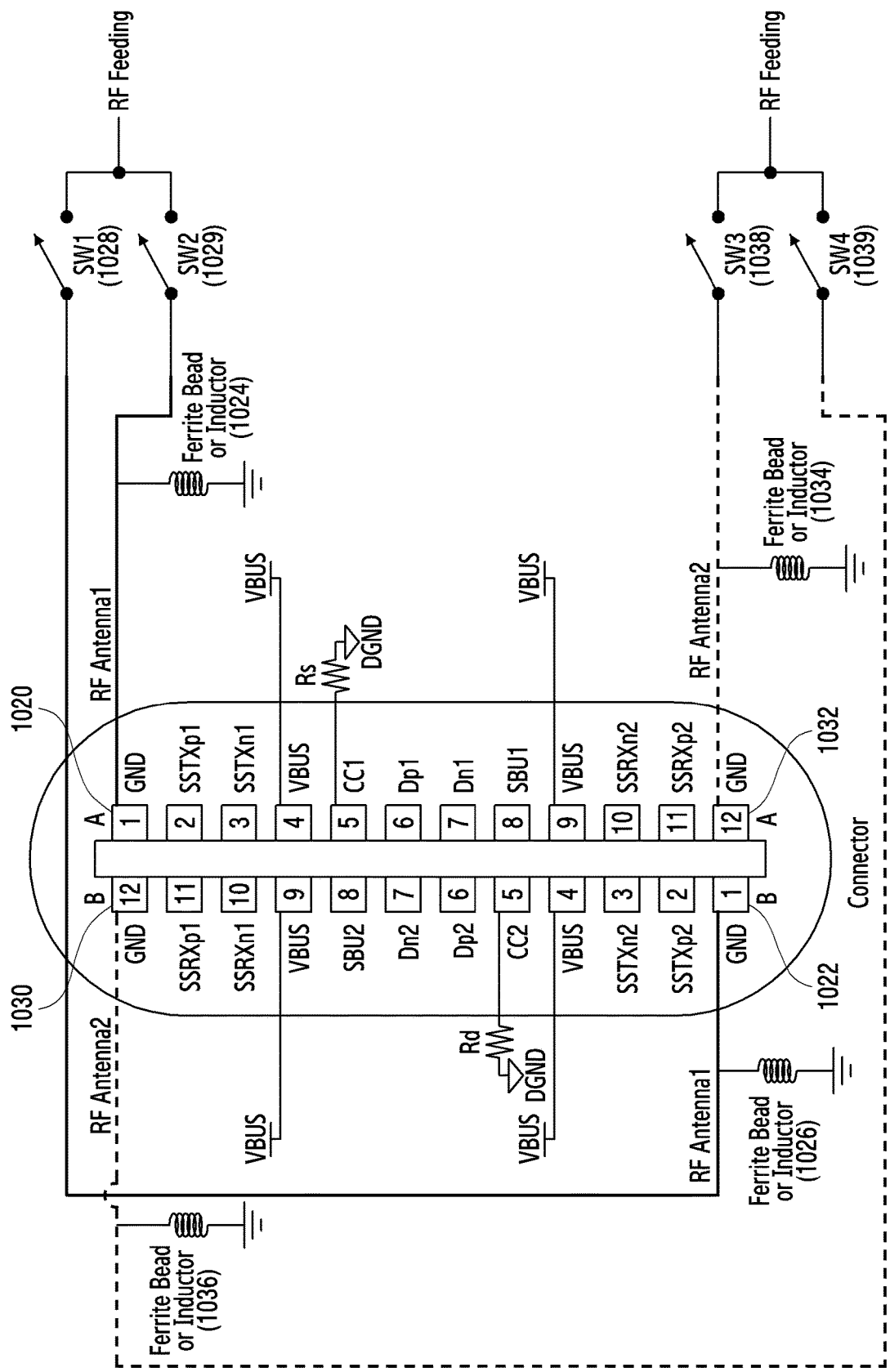

According to an embodiment, as shown in FIG. 10C, the connector 300 may selectively connect ground pin A1 1020 or ground pin B1 1022 to a communication module 190 capable of processing a signal for the first frequency band. For example, in the case where the connector 300 is coupled with the external connector 1000 through ground pin A1 1020, ground pin A1 1020 may be connected to the communication module 190 through a switch 2 (1029). A switch 1 (1028) may interrupt the connection between ground pin B1 1022 and the communication module 190. According to an embodiment, as shown in FIG. 10C, the connector 300 may selectively connect ground pin B12 1030 or ground pin A12 1032 to a communication module 190 capable of processing a signal for the second frequency band. For example, in the case where the connector 300 is coupled with an external connector 1000 of an external device (an antenna) through ground pin A12 1032, ground pin A12 1032 may be connected to the communication module 190 through a switch 3 (1038). A switch 4 (1039) may interrupt the connection between ground pin B12 1030 and the communication module 190. As an example, the processor 120 may control the switches 1028, 1029, 1038, and 1039 such that the ground pin 1020, 1022, 1030, or 1032 is selectively connected to the communication module 190. According to an embodiment, ferrite beads or inductors 1024, 1026, 1034, and 1036 may be disposed in respective channels between the ground pin 1020, 1022, 1030, or 1032 and the communication module 190.

Figure 10D:
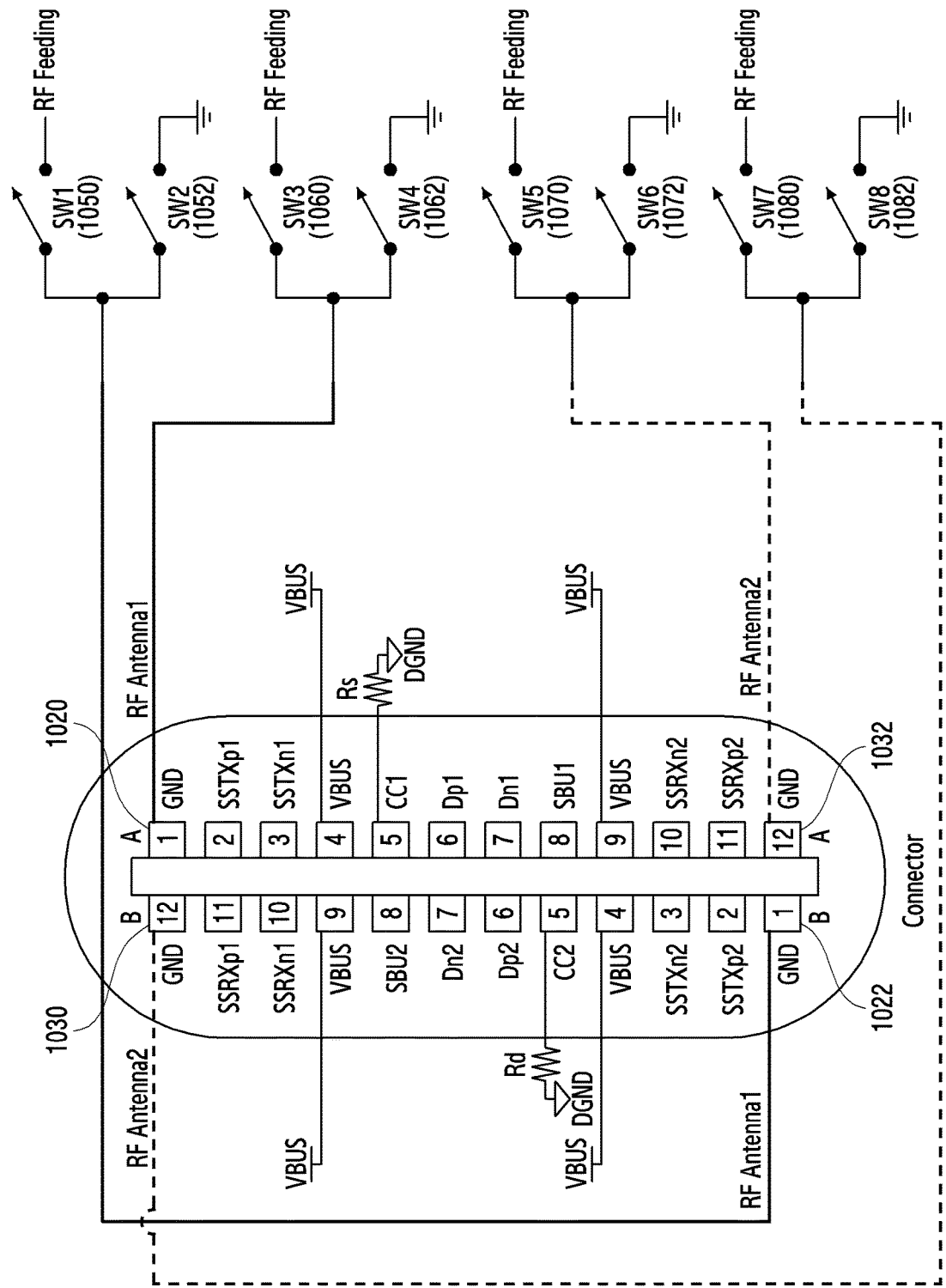

According to an embodiment, as shown in FIG. 10D, the connector 300 may selectively connect ground pin A1 1020 or ground pin B1 1022 to a communication module 190 capable of processing a signal for the first frequency band or a ground. For example, in the case where the connector 300 is coupled with the external connector 1000 through ground pin B1 1022, ground pin B1 1022 may be connected to the communication module 190 through a switch 1 (1050). Ground pin A1 1020 may be connected to the ground through a switch 4 (1062). According to an embodiment, the connector 300 may selectively connect ground pin B12 1030 or ground pin A12 1032 to a communication module 190 capable of processing a signal for the second frequency band or to a ground. For example, in the case where the connector 300 is coupled with an external connector 1000 of an external device (an antenna) through ground pin B12 1030, ground pin B12 1030 may be connected to the communication module 190 through a switch 7 (1080). Ground pin A12 1032 may be connected to the ground through a switch 6 (1072). As an example, the processor 120 may control the switches 1050, 1052, 1060, 1062, 1070, 1072, 1080, and 1082 such that the ground pin 1020, 1022, 1030, or 1032 is selectively connected to the communication module 190 or the ground.

Figure 10E:
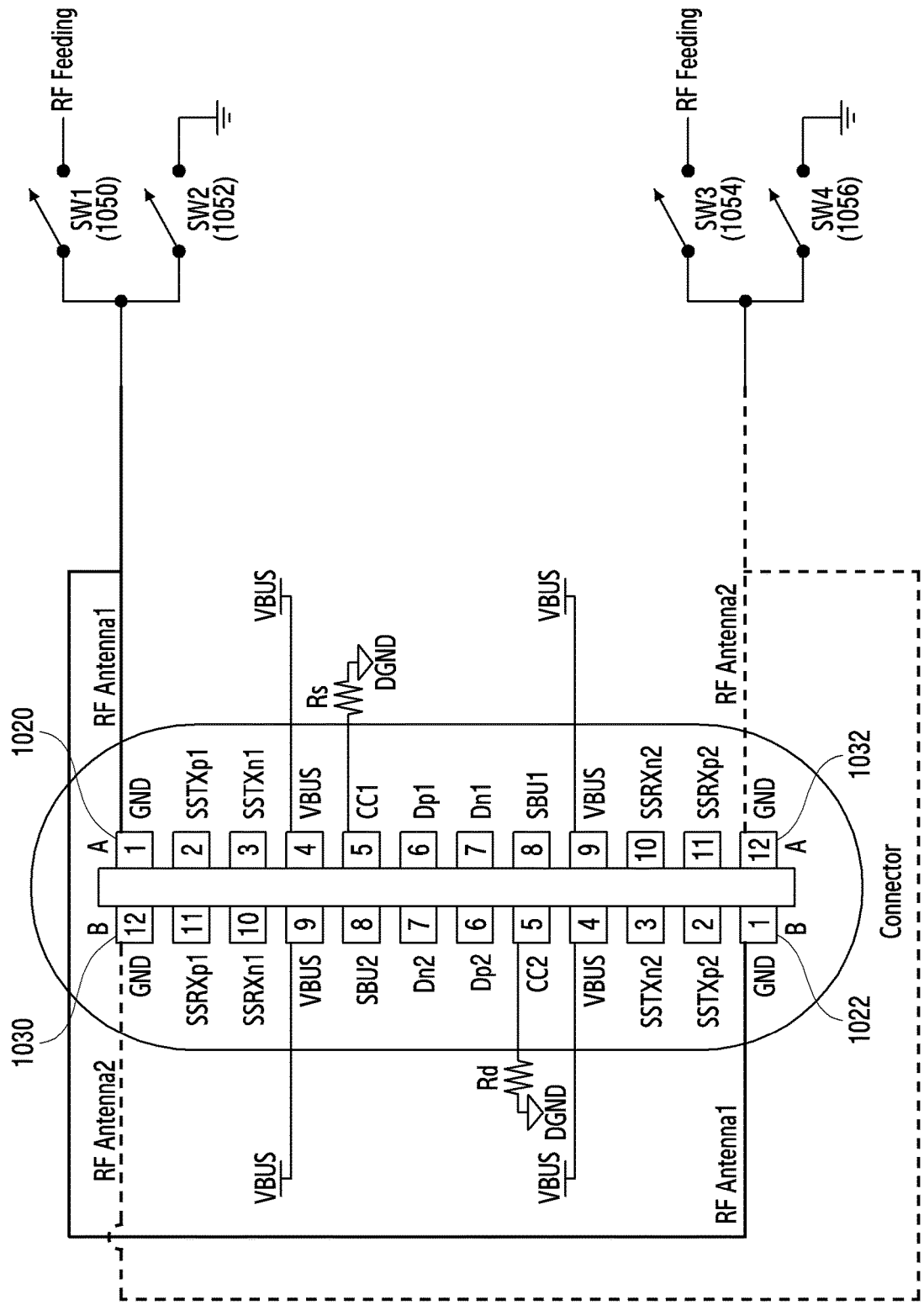

According to an embodiment, as shown in FIG. 10E, the connector 300 may selectively connect ground pin A1 1020 and ground pin B1 1022 to a communication module 190 capable of processing a signal for the first frequency band or a ground. For example, in the case where the connector 300 is coupled with the external connector 1000, as shown in FIG. 10A, through ground pin A1 1020 and ground pin B1 1022 of FIG. 10E, ground pin A1 1020 and ground pin B1 1022 may be connected to the communication module 190 through a switch 1 (1050). In the case where the connector 300 is not coupled with the external connector 1000 through ground pin A1 1020 and ground pin B1 1022 of FIG. 10E, ground pin A1 1020 and ground pin B1 1022 may be connected to the ground through a switch 2 (1052). According to an embodiment, the connector 300 may selectively connect ground pin B12 1030 and ground pin A12 1032 to a communication module 190 capable of processing a signal for the second frequency band or a ground.

According to various embodiments of the disclosure, the electronic device 101 includes a connector (e.g., the connecting terminal of FIG. 1 or the connector 300 of FIG. 3) and a wireless communication circuit (e.g., the communication module 190 of FIG. 1) capable of receiving wireless communication data. The connector includes a housing that forms the outer surface of the connector and has an opening formed in at least a part thereof to enable coupling with an external connector in a first direction or a second direction, a plurality of first pins corresponding to the first direction, and a plurality of second pins corresponding to the second direction. The plurality of first pins includes at least one first ground pin, which corresponds to a first frequency band and is capable of being connected to the wireless communication circuit, and at least one second ground pin, which corresponds to a second frequency band and is capable of being connected to the wireless communication circuit. The plurality of second pins includes at least one third ground pin, which corresponds to the first frequency band and is capable of being connected to the wireless communication circuit, and at least one fourth ground pin, which corresponds to the second frequency band and is capable of being connected to the wireless communication circuit.

According to various embodiments, the plurality of second pins may be disposed in a reversible structure with respect to the plurality of first pins corresponding to the first direction.

According to various embodiments, the first frequency band may include any one of a digital multimedia broadcasting (DMB) frequency band, a digital video broadcasting (DVB)/digital audio broadcasting (DAB) frequency band, an integrated services digital broadcasting terrestrial (ISDB-T) frequency band, or a frequency modulation (FM) frequency band, and the second frequency band may include any one different from the first frequency band, among the DMB frequency band, the DVB/DAB frequency band, the ISDB-T frequency band, or the FM frequency band.

According to various embodiments, the first ground pin and the third ground pin may be disposed in a reversible structure, and the second ground pin and the fourth ground pin may be disposed in a reversible structure.

According to various embodiments, the electronic device may further include at least one processor that is electrically connected to the wireless communication circuit and the connector. The at least one processor may be configured to selectively connect at least one of the first ground pin, the second ground pin, the third ground pin, or the fourth ground pin to the wireless communication circuit.

According to various embodiments, the processor may be configured to connect the first ground pin or the third ground pin to the wireless communication circuit on the basis of the coupling direction of the external connector, and to connect the second ground pin or the fourth ground pin to the wireless communication circuit on the basis of the coupling direction of the external connector.

According to various embodiments, the processor may be configured to connect the third ground pin to a ground in the case where the first ground pin is connected to the wireless communication circuit, and to connect the fourth ground pin to the ground in the case where the second ground pin is connected to the wireless communication circuit.

According to various embodiments, an external device including the external connector may include at least one antenna corresponding to at least one frequency band.

According to various embodiments, the connector may include a universal serial bus (USB) type-C connector.

According to various embodiments of the disclosure, the electronic device 101 includes a connector (e.g., the connecting terminal 178 of FIG. 1 or the connector 300 of FIG. 3) and a wireless communication circuit (e.g., the communication module 190 of FIG. 1) capable of receiving wireless communication data. The connector includes a housing that forms the outer surface of the connector and has an opening formed in at least a part thereof to enable coupling with an external connector in a first direction or a second direction, a plurality of first pins corresponding to the first direction, and a plurality of second pins corresponding to the second direction. The plurality of first pins includes at least one first ground pin, which corresponds to a first frequency band and is capable of being connected to the wireless communication circuit or a ground, and at least one second ground pin, which corresponds to a second frequency band and is capable of being connected to the wireless communication circuit or the ground. The plurality of second pins includes at least one third ground pin, which corresponds to the first frequency band and is capable of being connected to the wireless communication circuit or the ground, and at least one fourth ground pin, which corresponds to the second frequency band and is capable of being connected to the wireless communication circuit or the ground.

According to various embodiments, the plurality of first pins and the plurality of second pins may be disposed in a reversible structure.

According to various embodiments, the first ground pin and the third ground pin may be disposed in a reversible structure, and the second ground pin and the fourth ground pin may be disposed in a reversible structure in a reverse direction.

According to various embodiments, the electronic device may further include at least one processor that is electrically connected to the wireless communication circuit and the connector. The at least one processor may be configured to selectively connect the first ground pin or the third ground pin to one of the wireless communication circuit and the ground, and to selectively connect the second ground pin or the fourth ground pin to one of the wireless communication circuit and the ground.

According to various embodiments, the processor may be configured to selectively connect the first ground pin or the third ground pin to one of the wireless communication circuit and the ground on the basis of the coupling direction of the external connector, and to selectively connect the second ground pin or the fourth ground pin to one of the wireless communication circuit and the ground on the basis of the coupling direction of the external connector.

According to various embodiments, the processor may be configured to connect the third ground pin to the ground in the case where the first ground pin is connected to the wireless communication circuit, and to connect the fourth ground pin to the ground in the case where the second ground pin is connected to the wireless communication circuit.

According to various embodiments, the connector may include a universal serial bus (USB) type-C connector.

Figure 11:
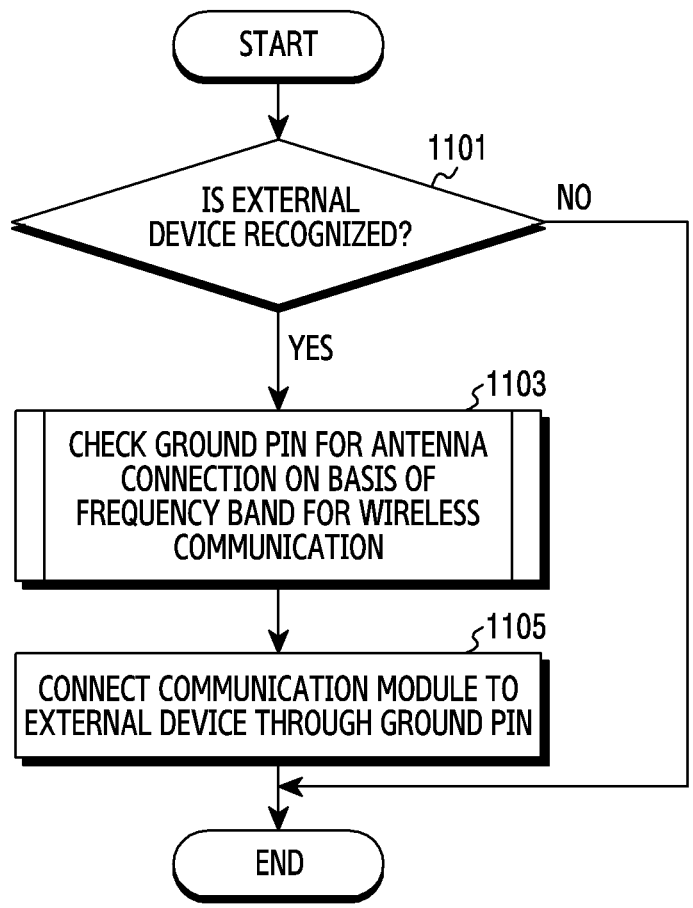
FIG. 11 is a flowchart showing connection of an antenna using a connector in an electronic device according to various embodiments of the disclosure.

FIG. 11 is a flowchart showing the connection of an antenna using a connector in an electronic device according to various embodiments of the disclosure. In the following description, the electronic device may include at least a part of the electronic device 101 of FIG. 1, and the connector may include at least a part of the connector 300 of FIG. 3 (e.g., the connecting terminal 178 of FIG. 1).

Referring to FIG. 11, in process 1101, the electronic device 101 (e.g., the processor 120) may recognize the external device coupled with the connector 300 through at least one pin of the connector 300. For example, the processor 120 may detect coupling with an external connector (e.g., the external connector 242 of FIG. 2) of the external device through at least one pin (e.g., the CC pins 418a and 418b of FIG. 4) of a plurality of signal pins included in the connector 300.

In process 1103, the electronic device 101 (e.g., the processor 120) may check at least one ground pin for connection with the external device (the antenna) among a plurality of ground pins included in the connector 300 on the basis of a frequency band for wireless communication used through the connection with the external device (the antenna). According to an embodiment, the processor 120 may select at least one ground pin, which corresponds to a frequency band supported through the external device (the antenna), among the plurality of ground pins (e.g., the ground pins 1020, 1022, 1030, and 1032 of FIG. 10B) of the connector 300. As an example, in the case where the processor 120 supports a first frequency band through the external device, the processor 120 may select ground pins A1 and B1 1020 and 1022 of FIG. 10B. As another example, in the case where the processor 120 supports a second frequency band through the external device, the processor 120 may select ground pins B12 and A12 1030 and 1032 of FIG. 10B.

In process 1105, the electronic device 101 (e.g., the processor 120) may connect the external device (the antenna) and the communication module 190 of the electronic device 101 through at least one ground pin, which corresponds to a frequency band for wireless communication used through the connection with the external device (the antenna). For example, in the case where the processor 120 supports a first frequency band through the external device, the processor 120 may connect the communication module 190 and the external device (the antenna) through at least one of ground pin A1 1020 or ground pin B1 1022, corresponding to each other in the reversible structure of the connector 300, as shown in FIG. 10B. For example, in the case where the processor 120 supports a second frequency band through the external device, the processor 120 may connect the communication module 190 and the external device (the antenna) through at least one of ground pin B12 1030 or ground pin A12 1032, corresponding to each other in the reversible structure of the connector 300, as shown in FIG. 10B.

Figure 12:
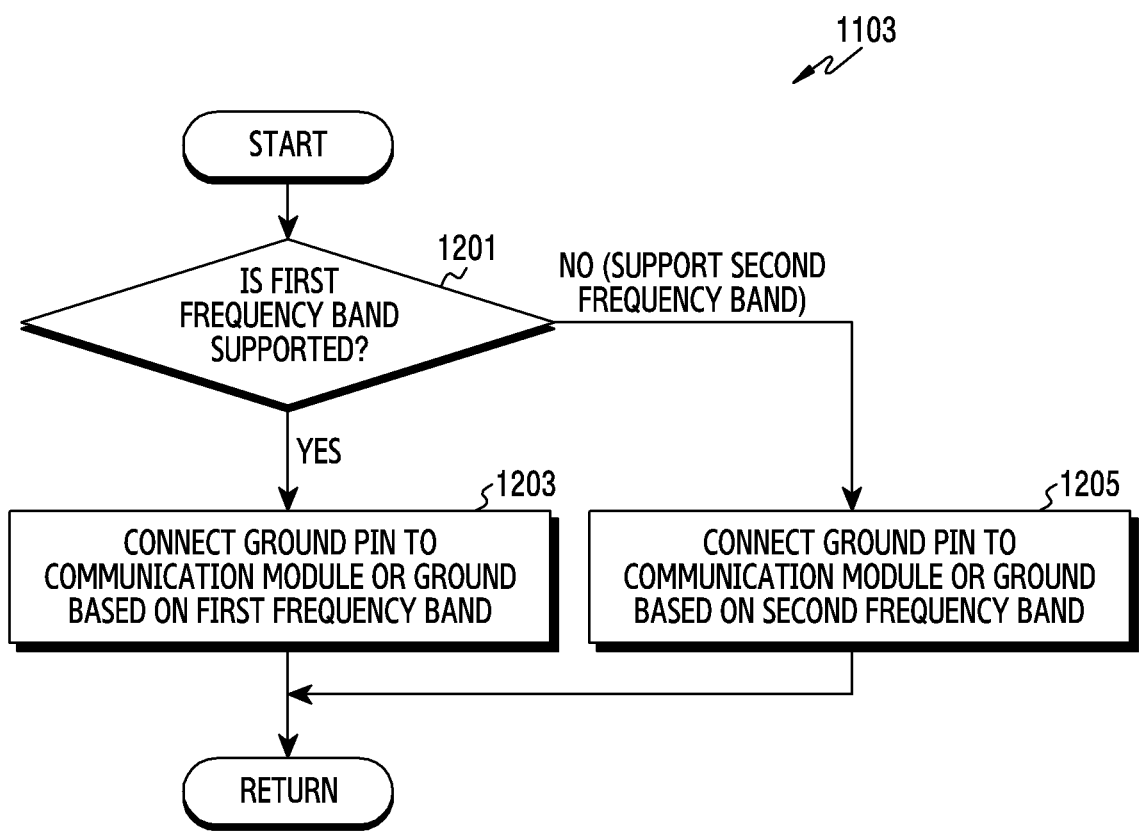
FIG. 12 is a flowchart showing selection of a pin of a connector for connection with an antenna in an electronic device according to various embodiments of the disclosure.

FIG. 12 is a flowchart showing selection of a pin of a connector for connection with an antenna in an electronic device according to various embodiments of the disclosure. In the following description, the process of checking the ground pin for connection with the external device in process 1103 of FIG. 11 will be described. In the following description, the electronic device may include at least a part of the electronic device 101 of FIG. 1, and the connector may include at least a part of the connector 300 of FIG. 3 (e.g., the connecting terminal 178 of FIG. 1).

Referring to FIG. 12, in process 1201, in the case where the electronic device 101 (e.g., the processor 120) recognizes the external device coupled with the connector 300 (e.g., in process 1101 of FIG. 11), the processor 120 may check whether a first frequency band is supported through connection with the external device (the antenna). For example, the processor 120 may check whether to perform wireless communication of the first frequency band through the external device (the antenna) connected through the connector 300.

In process 1203, in the case where the electronic device 101 (e.g., the processor 120) supports the first frequency band through the connection with the external device (the antenna), the processor 120 may selectively connect a plurality of ground pins included in the connector 300 to a communication module or a ground on the basis of the first frequency band. For example, in the case where the processor 120 supports the first frequency band through the external device, the processor 120 may control the switch 1 (1050) such that ground pin A1 1020 and ground pin B1 1022, corresponding to each other in the reversible structure of the connector 300, as shown in FIG. 10E, are connected to the communication module 190. The processor 120 may control the switch 4 (1056) such that ground pin B12 1030 and ground pin A12 1032, corresponding to each other in the reversible structure of the connector 300 as shown in FIG. 10E, are connected to the ground.

In process 1205, in the case where the electronic device 101 (e.g., the processor 120) supports a second frequency band through the connection with the external device (the antenna), the processor 120 may selectively connect a plurality of ground pins included in the connector 300 to a communication module or a ground on the basis of the second frequency band. For example, in the case where the processor 120 supports the second frequency band through the external device, the processor 120 may control the switch 3 (1054) such that ground pins B12 and A12 1030 and 1032 of the connector 300 as shown in FIG. 10E are connected to the communication module 190. The processor 120 may control the switch 2 (1052) such that ground pins A1 and B1 1020 and 1022 of the connector 300 as shown in FIG. 10E are connected to the ground.

According to various embodiments of the disclosure, the electronic device 101 (e.g., the processor 120) may selectively connect a plurality of ground pins to a communication module or a ground on the basis of a frequency band supported through connection with an external device (an antenna) and a connection direction (CC1 or CC2) of the external device. For example, in the case where the processor 120 supports the first frequency band through the external device and the external connector 1000 of FIG. 10A is connected in the first direction (CC1) and supports antenna connection to ground pin A1 1002, the processor 120 may control a switch 3 (1060) such that ground pin A1 1020 of the connector 300 shown in FIG. 10D is connected to the communication module 190. The processor 120 may control the switch 2 (1052), the switch 6 (1072), and the switch 8 (1082) such that ground pin B1 1022, ground pin B12 1030, and ground pin A12 1032 of the connector 300, shown in FIG. 10D, are connected to the ground. For example, in the case where the processor 120 supports the first frequency band through the external device and the external connector 1000 of FIG. 10A is connected in the second direction (CC2) and supports antenna connection to ground pin B1 1004, the processor 120 may control the switch 1 (1050) such that ground pin B1 1022 of the connector 300 as shown in FIG. 10D is connected to the communication module 190. The processor 120 may control the switch 4 (1062), the switch 6 (1072), and the switch 8 (1082) such that ground pin A1 1020, ground pin B12 1030, and ground pin A12 1032 of the connector 300 as shown in FIG. 10D are connected to the ground. For example, in the case where the processor 120 supports the second frequency band through the external device and the external connector 1000 of FIG. 10A is connected in the first direction (CC1) and supports antenna connection to ground pin B12 1012, the processor 120 may control the switch 7 (1080) such that ground pin B12 1030 of the connector 300 as shown in FIG. 10D is connected to the communication module 190. The processor 120 may control the switch 2 (1052), the switch 4 (1062), and the switch 6 (1072) such that ground pin A1 1020, ground pin B1 1022, and ground pin A12 1032 of the connector 300 as shown in FIG. 10D are connected to the ground. For example, in the case where the processor 120 supports the second frequency band through the external device and the external connector 1000 of FIG. 10A is connected in the second direction (CC2) and supports antenna connection to ground pin A12 1014, the processor 120 may control the switch 5 (1070) such that ground pin A12 1032 of the connector 300 as shown in FIG. 10D is connected to the communication module 190. The processor 120 may control the switch 2 (1052), the switch 4 (1062), and the switch 8 (1082) such that ground pin A1 1020, ground pin B1 1022, and ground pin B12 1030 of the connector 300 are connected to the ground, as shown in FIG. 10D.

According to an embodiment, the electronic device 101 may check a connection direction (CC1 or CC2) of the external device using at least one pin of the connector 300. According to an embodiment, in the case where an external device other than an audio unit is connected through the connector 300, the connection control module 310 may determine the direction of coupling (CC1 or CC2) of the external device to the connector 300 on the basis of a change in the voltage of the CC pin (the CC pin 418a or 418b of FIG. 4) of the connector 300. According to an embodiment, in the case where an audio unit is connected through the connector 300, the connection control module 310 may determine the connection direction (CC1 or CC2) of the external device to the connector 300 on the basis of a change in the voltage of the pin SBU (SBU1 415b or SBU2 415a of FIG. 4) of the connector 300.

According to various embodiments of the disclosure, the electronic device 101 may be connected to different antennas (external devices) corresponding to different frequency bands through the first connector hole 208 (the connector) and the second connector hole 209 (the earphone jack). For example, the electronic device 101 may be connected to a first antenna, corresponding to a first frequency band, through the first connector hole 208, and to a second antenna, corresponding to a second frequency band different from the first frequency band, through the second connector hole 209. As an example, as shown in FIGS. 10B to 10E, the electronic device may be connected to antennas of a plurality of frequency bands different from the second frequency band through the first connector hole 208.

According to various embodiments of the disclosure, an operating method of the electronic device 101, which includes a wireless communication circuit (e.g., the communication module 190 of FIG. 1) and a connector (the connecting terminal 178 of FIG. 1 or the connector 300 of FIG. 3) capable of being coupled with an external connector in a first or second direction and includes a plurality of first pins corresponding to the first direction and a plurality of second pins corresponding to the second direction, the operating method including: a process of detecting connection with the external connector; a process of selecting at least one of a plurality of ground pins included in the connector on the basis of a frequency band for wireless communication, wherein, among the plurality of ground pins, the first pins include at least one first ground pin, which corresponds to a first frequency band and is capable of being connected to the wireless communication circuit, and at least one second ground pin, which corresponds to a second frequency band and is capable of being connected to the wireless communication circuit, and the second pins include at least one third ground pin, which corresponds to the first frequency band and is capable of being connected to the wireless communication circuit, and at least one fourth ground pin, which corresponds to the second frequency band and is capable of being connected to the wireless communication circuit; and a process of connecting the at least one ground pin to the wireless communication circuit.

According to various embodiments, the process of connecting to the wireless communication circuit may include a process of connecting the first ground pin or the third ground pin to the wireless communication circuit in the case where wireless communication is performed using the first frequency band and a process of connecting the second ground pin or the fourth ground pin to the wireless communication circuit in the case where the wireless communication is performed using the second frequency band.

According to various embodiments, the process of connecting to the wireless communication circuit may include a process of selectively connecting the first ground pin or the third ground pin to one of the wireless communication circuit and the ground on the basis of a coupling direction of the external connector, or a process of selectively connecting the second ground pin or the fourth ground pin to one of the wireless communication circuit and the ground on the basis of the coupling direction of the external connector.

According to various embodiments, the selective connection process may include a process of connecting the third ground pin to the ground in the case where the first ground pin is connected to the wireless communication circuit, or a process of connecting the fourth ground pin to the ground in the case where the second ground pin is connected to the wireless communication circuit.

Although various embodiments of the disclosure have been described, various modifications are possible without departing from the scope of the various embodiments of the disclosure. Therefore, the scope of the various embodiments of the disclosure should not be limited to the described embodiments, but should be defined by the claims set forth below as well as equivalents thereto.

The invention claimed is:
1. An electronic device comprising:
a wireless communication circuit capable of receiving wireless communication data; and
a connector,
wherein the connector includes
a housing that forms an outer surface of the connector and has an opening formed in at least a part of the outer surface to enable coupling with an external connector in a first direction or a second direction,
a plurality of first pins corresponding to the first direction, and
a plurality of second pins corresponding to the second direction,
the plurality of first pins include at least one first ground pin, which corresponds to a first frequency band and is capable of being connected to the wireless communication circuit, and at least one second ground pin, which corresponds to a second frequency band and is capable of being connected to the wireless communication circuit, and
the plurality of second pins include at least one third ground pin, which corresponds to the first frequency band and is capable of being connected to the wireless communication circuit, and at least one fourth ground pin, which corresponds to the second frequency band and is capable of being connected to the wireless communication circuit.

2. The electronic device as claimed in claim 1, wherein the plurality of second pins is disposed in a reversible structure with respect to the plurality of first pins corresponding to the first direction.

3. The electronic device as claimed in claim 1, wherein:
the first ground pin and the third ground pin are disposed in a reversible structure; and
the second ground pin and the fourth ground pin are disposed in a reversible structure.

4. The electronic device as claimed in claim 1, further comprising at least one processor that is electrically connected to the wireless communication circuit and the connector,
wherein the at least one processor is configured to selectively connect at least one of the first ground pin, the second ground pin, the third ground pin, or the fourth ground pin to the wireless communication circuit.

5. The electronic device as claimed in claim 4, wherein the processor is configured:
to connect the first ground pin or the third ground pin to the wireless communication circuit based on a coupling direction of the external connector; and
to connect the second ground pin or the fourth ground pin to the wireless communication circuit based on the coupling direction of the external connector.

6. The electronic device as claimed in claim 4, wherein the processor is configured:
to connect the third ground pin to a ground in a case where the first ground pin is connected to the wireless communication circuit; and
to connect the fourth ground pin to the ground in a case where the second ground pin is connected to the wireless communication circuit.

7. The electronic device as claimed in claim 1, wherein an external device including the external connector includes at least one antenna corresponding to at least one frequency band.

8. An electronic device comprising:
a wireless communication circuit capable of receiving wireless communication data; and
a connector,
wherein the connector includes
a housing that forms an outer surface of the connector and has an opening formed in at least a part of the outer surface to enable coupling with an external connector in a first direction or a second direction, a plurality of first pins corresponding to the first direction, and a plurality of second pins corresponding to the second direction, the plurality of first pins include at least one first ground pin, which corresponds to a first frequency band and is capable of being connected to the wireless communication circuit or a ground, and at least one second ground pin, which corresponds to a second frequency band and is capable of being connected to the wireless communication circuit or the ground, and the plurality of second pins include at least one third ground pin, which corresponds to the first frequency band and is capable of being connected to the wireless communication circuit or the ground, and at least one fourth ground pin, which corresponds to the second frequency band and is capable of being connected to the wireless communication circuit or the ground.

9. The electronic device as claimed in claim 8, wherein the plurality of first pins and the plurality of second pins are disposed in a reversible structure.

10. The electronic device as claimed in claim 8, wherein:
the first ground pin and the third ground pin are disposed in a reversible structure; and
the second ground pin and the fourth ground pin are disposed in a reversible structure.

11. The electronic device as claimed in claim 8, further comprising at least one processor that is electrically connected to the wireless communication circuit and the connector,
wherein the at least one processor is configured:
to selectively connect the first ground pin or the third ground pin to one of the wireless communication circuit and the ground; and
to selectively connect the second ground pin or the fourth ground pin to one of the wireless communication circuit and the ground.

12. The electronic device as claimed in claim 11, wherein the processor is configured:
to selectively connect the first ground pin or the third ground pin to one of the wireless communication circuit and the ground based on a coupling direction of the external connector; and
to selectively connect the second ground pin or the fourth ground pin to one of the wireless communication circuit and the ground based on the coupling direction of the external connector.

13. An operating method of an electronic device that includes a wireless communication circuit and a connector capable of being coupled with an external connector in a first or second direction and includes a plurality of first pins corresponding to the first direction and a plurality of second pins corresponding to the second direction, the operating method comprising:
a process of detecting connection with the external connector;
a process of selecting at least one of a plurality of ground pins included in the connector based on a frequency band for wireless communication, wherein, among the plurality of ground pins, the first pins include at least one first ground pin, which corresponds to a first frequency band and is capable of being connected to the wireless communication circuit, and at least one second ground pin, which corresponds to a second frequency band and is capable of being connected to the wireless communication circuit, and the second pins include at least one third ground pin, which corresponds to the first frequency band and is capable of being connected to the wireless communication circuit, and at least one fourth ground pin, which corresponds to the second frequency band and is capable of being connected to the wireless communication circuit; and
a process of connecting the at least one ground pin to the wireless communication circuit.

14. The operating method as claimed in claim 13, wherein the process of connecting to the wireless communication circuit includes:
a process of connecting the first ground pin or the third ground pin to the wireless communication circuit in a case where wireless communication is performed using the first frequency band; and
a process of connecting the second ground pin or the fourth ground pin to the wireless communication circuit in a case where the wireless communication is performed using the second frequency band.

15. The operating method as claimed in claim 14, wherein the process of connecting to the wireless communication circuit includes:
a process of selectively connecting the first ground pin or the third ground pin to one of the wireless communication circuit or the ground based on a coupling direction of the external connector; or
a process of selectively connecting the second ground pin or the fourth ground pin to one of the wireless communication circuit and the ground based on the coupling direction of the external connector.

* * * * *